United States Patent
Stabler et al.

(10) Patent No.: US 12,281,212 B2
(45) Date of Patent: Apr. 22, 2025

(54) PVC AND PVC ALLOY FORMULATIONS FOR USE AS RESINS IN THERMOPLASTIC CONTINUOUS FIBER REINFORCEMENT COMPOSITES AND METHODS OF FORMULATING THE SAME

(71) Applicant: SEKISUI KYDEX, LLC, Bloomsburg, PA (US)

(72) Inventors: Sean Stabler, Bloomsburg, PA (US); Nathan Wright, Bloomsburg, PA (US)

(73) Assignee: SEKISUI KYDEX, LLC, Bloomsburg, PA (US)

( * ) Notice: Subject to any disclaimer, the term of this patent is extended or adjusted under 35 U.S.C. 154(b) by 309 days.

(21) Appl. No.: 17/537,453

(22) Filed: Nov. 29, 2021

(65) Prior Publication Data

US 2022/0169805 A1 Jun. 2, 2022

Related U.S. Application Data

(60) Provisional application No. 63/119,441, filed on Nov. 30, 2020.

(51) Int. Cl.
| | |
|---|---|
| *C08L 33/12* | (2006.01) |
| *C08J 5/04* | (2006.01) |
| *C08L 27/06* | (2006.01) |
| *C08L 27/24* | (2006.01) |

(52) U.S. Cl.
CPC .............. *C08J 5/04* (2013.01); *C08L 27/06* (2013.01); *C08L 27/24* (2013.01); *C08L 33/12* (2013.01); *C08J 2327/06* (2013.01); *C08J 2327/24* (2013.01)

(58) Field of Classification Search
None
See application file for complete search history.

(56) References Cited

U.S. PATENT DOCUMENTS

| | | | | |
|---|---|---|---|---|
| 2,952,984 | A | | 9/1960 | Marshall, Jr. |
| 3,316,192 | A | * | 4/1967 | Seibel ...................... C08K 5/37 524/400 |
| 4,280,940 | A | * | 7/1981 | Klug ........................ C08L 27/06 524/400 |
| 4,412,898 | A | | 11/1983 | Olson et al. |
| 4,448,932 | A | * | 5/1984 | Ozari ........................ C08L 27/06 525/85 |
| 4,458,046 | A | | 7/1984 | Hornbaker et al. |
| 4,536,360 | A | | 8/1985 | Rahrig |
| 5,008,145 | A | * | 4/1991 | Kinson ..................... C08L 27/06 523/213 |
| 5,938,977 | A | * | 8/1999 | Rosenthal ............... C08K 5/005 252/407 |
| 6,510,706 | B2 | | 1/2003 | Stone et al. |
| 7,216,507 | B2 | | 5/2007 | Cuellar et al. |
| 2003/0176544 | A1 | * | 9/2003 | Hawrylko ................ C08K 3/26 524/425 |
| 2008/0153966 | A1 | * | 6/2008 | Feinberg ................. C08L 27/06 524/427 |
| 2011/0129629 | A1 | * | 6/2011 | Kaytan ................ C08K 5/3415 428/36.9 |
| 2014/0051787 | A1 | * | 2/2014 | Kann ....................... C08L 27/06 525/190 |
| 2016/0369086 | A1 | * | 12/2016 | Jakupca ................... C08K 5/09 |

FOREIGN PATENT DOCUMENTS

| | | |
|---|---|---|
| CN | 101693778 A | 4/2010 |
| CN | 102329467 B | 1/2012 |
| CN | 108102249 A | 6/2018 |
| CN | 109337241 A | 2/2019 |
| CN | 111690221 A | 9/2020 |
| JP | 2019-085332 | 6/2019 |

OTHER PUBLICATIONS

International Search Report and Written Opinion on PCT Appl. Ser. No. PCT/US2021/060948 dated Jun. 29, 2022 (9 pages).
International Preliminary Report on Patentability for PCT App. PCT/US2021/060948 dated May 30, 2023 (7 pages).
D.Chan: Acrylic Impact Modifiers for Rigid PVC Compound: Composite Aim Technology II , Jan. 1, 2018 (Jan. 1, 2018), XP93156600, Retrieved from the Internet: URL:https://www.vinyl.org.au/images/vinyl/Events/PVCAUS2018-presentations/Dexter-Chan-Alex-Krassas-Arkema-v3-AUST.pdf * p. 4 * * p. 12 *.
Extended European Search Report dated May 21, 2024 on EPO App. 21899167.7 (11 pages).

* cited by examiner

*Primary Examiner* — Robert C Boyle
(74) *Attorney, Agent, or Firm* — Foley & Lardner LLP

(57) ABSTRACT

Disclosed herein are thermoplastic polymer matrix compositions for a continuous fiber reinforced thermoplastic composite article, comprising at least one of poly(vinyl chloride) and/or chlorinated poly(vinyl chloride). Also disclosed herein are methods for formulating thermoplastic polymer matrix compositions suitable for impregnating continuous fibers for continuous fiber-reinforced thermoplastic composite articles, wherein the thermoplastic polymer matrix compositions have sufficient viscosity and thermal stability to impregnate continuous fibers and withstand thermal treatment at high temperatures and long residence times without decomposing.

20 Claims, 7 Drawing Sheets

| | Time (min) | | | | | |
|---|---|---|---|---|---|---|
| | 10 | 20 | 30 | 40 | 50 | 60 |
| Example 5 | | | | | | |
| Example 3 | | | | | | |
| Example 4 | | | | | | |

FIG. 1A

PVC AND PVC ALLOY FORMULATIONS FOR USE AS RESINS IN THERMOPLASTIC CONTINUOUS FIBER REINFORCEMENT COMPOSITES AND METHODS OF FORMULATING THE SAME

CROSS-REFERENCE TO RELATED APPLICATIONS

This application claims the benefit of and priority to U.S. Provisional Patent Application No. 63/119,441, filed on Nov. 30, 2020, the entire disclosure of which is incorporated by reference herein.

BACKGROUND

The present disclosure relates generally to the field of polymer composite materials for use in the aviation, automotive, mass transit, medical device, or construction industries as structural components or in applications requiring flame retardant ("FR") or chemical resistant properties. Continuous fiber-reinforced polymer materials are attractive candidates as structural materials due to their high strength and light weight, and several examples of continuous fiber-reinforced thermoplastic materials are known. Poly(vinyl chloride) ("PVC") is an attractive resin material for continuous fiber-reinforced thermoplastic materials due to its excellent flame retardancy, chemical resistance, and mechanical properties. However, PVC is difficult to formulate into continuous-fiber composite materials because its high viscosity makes it challenging to impregnate into fibers, high shear is required to stabilize PVC powders, and it is somewhat thermally unstable, making it unsuitable for composite impregnation steps requiring high temperatures and/or the combination of high temperature and long residence time. Thus, formulations of PVC and PVC alloys, which increase PVC's thermal stability and reduce its viscosity, such that PVC could be used as a polymer matrix material in continuous fiber-reinforced thermoplastic materials, are of great commercial interest.

SUMMARY

In one aspect, the present disclosure relates to a thermoplastic polymer matrix composition for a continuous fiber reinforced thermoplastic composite article, comprising at least one of poly(vinyl chloride) and/or chlorinated poly (vinyl chloride).

In some embodiments, the composition further comprises at least one of: blend polymers; oligomers; and additives. In some embodiments, the composition comprises one or more blend polymers and/or oligomers selected from acrylics, acrylic copolymers, olefins, olefin copolymers, polyamides, polyamide copolymers, acrylonitrile butadiene styrene, styrenics, and combinations or blends thereof. In some embodiments, the one or more blend polymers comprises poly (methyl methacrylate).

In some embodiments, the composition comprises one or more additives selected from stabilizers, co-stabilizers, impact modifiers, viscosity modifiers, thermal stability modifiers, process aids, lubricants, flame retardants, scavengers, smoke suppressants, fillers, lightweight additives, colorants, special effects additives, and combinations thereof.

In some embodiments, the composition has a dynamic thermal stability of at least 30 minutes at 320° F. In some embodiments, the composition has a dynamic thermal stability of at least 40 minutes at 320° F. In some embodiments, the composition has a dynamic thermal stability of at least 50 minutes at 320° F. In some embodiments, the composition has a dynamic thermal stability of at least 60 minutes at 320° F.

In some embodiments, the composition has a complex viscosity, measured as parallel plate viscosity, of at least about 240 Pa·s at 100 rad/s angular frequency and 200° C. In some embodiments, the composition has a complex viscosity, measured as parallel plate viscosity, of at least about 450 Pa·s at 100 rad/s angular frequency and 200° C.

In some embodiments, the composition has a viscosity, measured by capillary rheology, of at least about 1,000 Pa·s at 390° F. and a shear rate of 94.25 $s^{-1}$. In some embodiments, the composition has a viscosity, measured by capillary rheology, of at least about 1,100 Pa·s at 390° F. and a shear rate of 94.25 $s^{-1}$. In some embodiments, the composition has a viscosity, measured by capillary rheology, of at least about 1,400 Pa·s at 390° F. and a shear rate of 94.25 $s^{-1}$.

In some embodiments, the composition further comprises: 1 to 4 phr of one or more stabilizers or co-stabilizers; 0.01 to 30 phr of one or more impact modifiers; 0.01 to 15 phr of one or more process aids; and 0.01 to 5 phr of one or more lubricants. In some embodiments, the composition further comprises: 0.01 to 3 phr of one or more scavengers; and 0.01 to 50 phr of one or more flame retardants.

In another aspect, which is combinable with any other aspect or embodiment, the present disclosure relates to a method of formulating a thermoplastic polymer matrix composition for a continuous fiber reinforced thermoplastic composite article, wherein the composition comprises at least one of poly(vinyl chloride) and/or chlorinated poly (vinyl chloride), the method comprising: (i) adjusting the dynamic thermal stability of the composition, measured by a two-roll mill stability test, to at least 30 minutes at 320° F., by adding one or more stabilizers, co-stabilizers, and/or lubricants to the composition; and (ii) adjusting the viscosity of the composition, as measured by capillary rheology at 390° F. and a shear rate of 94.25 $s^{-1}$, to at least 1,000 Pa·s by adding one or more lubricants, blend polymers, and/or process aids to the composition. In some embodiments, the composition comprises poly(methyl methacrylate).

In some embodiments, the dynamic thermal stability in (i) is at least 30 minutes at 320° F. In some embodiments, the dynamic thermal stability in (i) is at least 40 minutes at 320° F. In some embodiments, the dynamic thermal stability in (i) is at least 50 minutes at 320° F. In some embodiments, the dynamic thermal stability in (i) is at least 60 minutes at 320° F.

In some embodiments, the viscosity in (ii) is at least 1,100 Pa·s. In some embodiments, the viscosity in (ii) is at least 1,400 Pa·s. 1131 In another aspect, which may be combined with any other aspect or embodiment, the present disclosure relates to a composite material, comprising: a thermoplastic polymer matrix composition comprising at least one of poly(vinyl chloride) and/or chlorinated poly(vinyl chloride); and a reinforcing material comprising continuous fibers in contact with the thermoplastic polymer matrix composition; wherein the thermoplastic polymer matrix composition impregnates the reinforcing material.

BRIEF DESCRIPTION OF THE FIGURES

FIG. 1A shows 1-inch×1-inch samples removed from the center of a roll of the Example PVC formulations at predetermined time intervals during two-roll mill stability testing.

DETAILED DESCRIPTION

Polymer Matrix

Figure 1B:
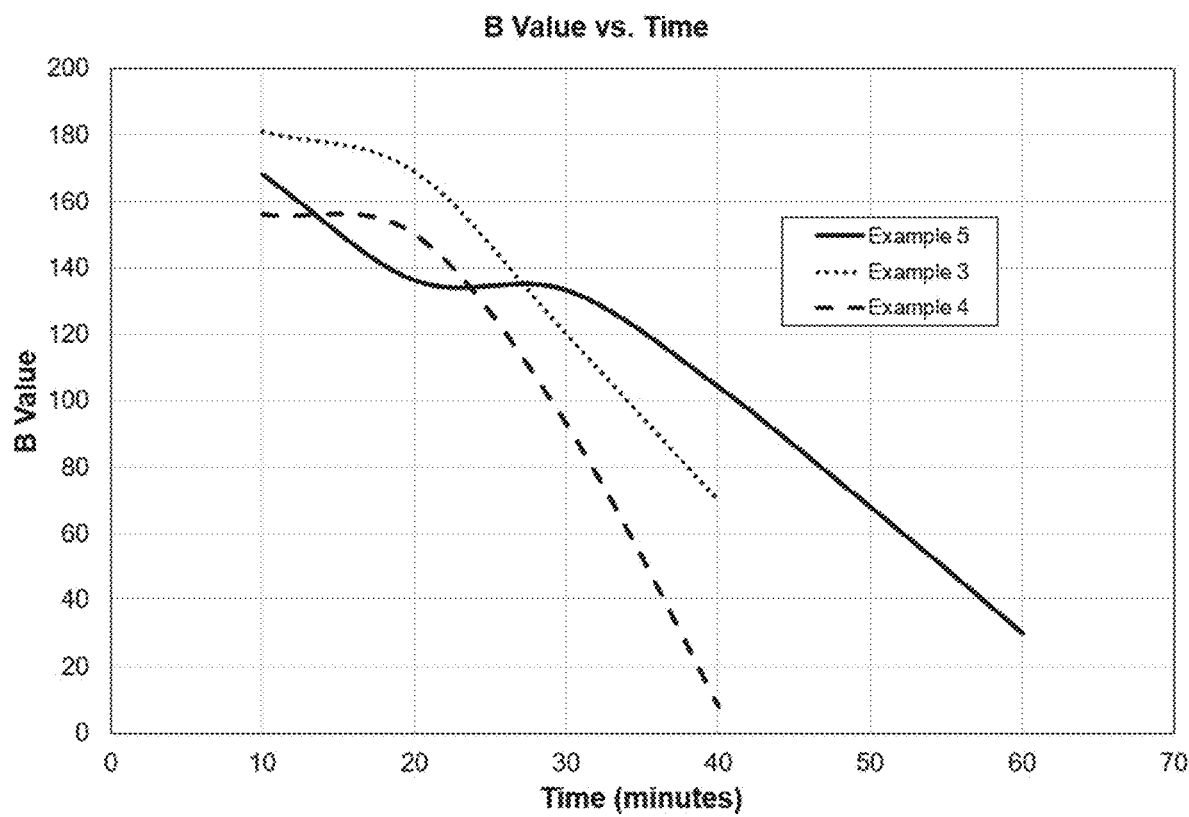
FIG. 1B shows B value versus time for the Example PVC resin formulations at pre-determined time intervals during two-roll mill stability testing.

In some embodiments according to the present disclosure, the polymer matrix comprises one or more thermoplastic polymers. In some embodiments, the one or more thermoplastic polymers may comprise one or more chlorinated polymers such as polyvinyl chloride ("PVC"), chlorinated PVC ("CPVC"), poly(vinylidene chloride) ("PVDC"), chlorinated polyethylene ("CPE"), or grafted copolymers of co-polyvinylchloride-acrylic, co-polyvinylchloride-ethylen-evinylacetate; polyesters such as poly(ethylene terephthalate) ("PET"), poly(1,4-butylene terephthalate), poly(1,4-cyclohexyldimethylene terephthalate), and poly(1,3-propyleneterephthalate); polyamides ("PA") such as PA-6,6, PA-6, PA-10, PA-10,10, PA-12, PA-11, and aromatic-aliphatic copolyamides; polyolefins such as polyethylene ("PE") (e.g., all forms of PE such as low density, linear low density, high density, etc.), polypropylene ("PP"), polystyrene ("PS"), polystyrene/poly(phenylene oxide) blends, polycarbonates ("PC") such as poly(bisphenol-A carbonate), polycarbonate copolymers such as co-polycarbonate polybutylene terephthalate; fluoropolymers including perfluoropolymers and partially fluorinated polymers such as copolymers of tetrafluoroethylene and hexafluoropropylene, poly(vinyl fluoride) ("PVF"), poly(vinylidene fluoride) ("PVDF"), and the copolymers of ethylene and vinylidene fluoride or vinyl fluoride; polysulfides such as poly(p-phenylene sulfide) ("PPS"); polyetherketones such as poly(ether-ketones) ("PEK"), poly(ether-ether-ketones) ("PEEK"), and poly(ether-ketone-ketones) ("PEKK"); poly(etherimides) ("PEI"); acrylonitrile-1,3-butadiene-styrene ("ABS") copolymers; thermoplastic (meth)acrylic polymers such as poly(methyl methacrylate) ("PMMA"), methyl methacrylate-butadiene-styrene ("MBS"); thermoplastic elastomers such as the "block" copolyester from terephthalate-1,4-butanediol and poly(tetramethylene ether)glycol, and a block polyolefin containing styrene and (hydrogenated) 1,3-butadiene blocks. In some embodiments, the polymer matrix may comprise homopolymers, copolymers, or blends (alloys) of any combination of the above polymers.

In some embodiments, the one or more thermoplastic polymers may comprise polyvinyl chloride ("PVC") and/or chlorinated PVC ("CPVC"). In some embodiments the one or more thermoplastic polymers may comprise poly(methyl methacrylate) ("PMMA"). In some embodiments, the one or more thermoplastic polymers may comprise homopolymers, copolymers, or blends (alloys) of two or more thermoplastic polymers.

Molecular Weight

The one or more thermoplastic polymers (e.g., PVC) may have any suitable weight average molecular weight. In some embodiments, the one or more thermoplastic polymers may have a weight average molecular weight of at least about 10,000 g/mol, at least about 20,000 g/mol, at least about 30,000 g/mol, at least about 40,000 g/mol, at least about 50,000 g/mol, at least about 60,000 g/mol, at least about 70,000 g/mol, at least about 80,000 g/mol, at least about 90,000 g/mol, at least about 100,000 g/mol, at least about 110,000 g/mol, at least about 120,000 g/mol, at least about 130,000 g/mol, at least about 140,000 g/mol, at least about 150,000 g/mol, at least about 160,000 g/mol, at least about 170,000 g/mol, at least about 180,000 g/mol, at least about 190,000 g/mol, at least about 200,000 g/mol, at least about 210,000 g/mol, at least about 220,000 g/mol, at least about 230,000 g/mol, at least about 240,000 g/mol, or at least about 250,000 g/mol, or any range or value thereinbetween.

In some embodiments the one or more thermoplastic polymers may have a weight average molecular weight of no greater than about 10,000 g/mol, no greater than about 20,000 g/mol, no greater than about 30,000 g/mol, no greater than about 40,000 g/mol, no greater than about 50,000 g/mol, no greater than about 60,000 g/mol, no greater than about 70,000 g/mol, no greater than about 80,000 g/mol, no greater than about 90,000 g/mol, no greater than about 100,000 g/mol, no greater than about 110,000 g/mol, no greater than about 120,000 g/mol, no greater than about 130,000 g/mol, no greater than about 140,000 g/mol, no greater than about 150,000 g/mol, no greater than about 160,000 g/mol, no greater than about 170,000 g/mol, no greater than about 180,000 g/mol, no greater than about 190,000 g/mol, no greater than about 200,000 g/mol, no greater than about 210,000 g/mol, no greater than about 220,000 g/mol, no greater than about 230,000 g/mol, no greater than about 240,000 g/mol, no greater than about 250,000 g/mol, or any range or value thereinbetween.

In some embodiments, the one or more thermoplastic polymers may have a weight average molecular weight of about 10,000 g/mol, about 20,000 g/mol, about 30,000 g/mol, about 40,000 g/mol, about 50,000 g/mol, about 60,000 g/mol, about 70,000 g/mol, about 80,000 g/mol, about 90,000 g/mol, about 100,000 g/mol, about 110,000 g/mol, about 120,000 g/mol, about 130,000 g/mol, about 140,000 g/mol, about 150,000 g/mol, about 160,000 g/mol, about 170,000 g/mol, about 180,000 g/mol, about 190,000 g/mol, about 200,000 g/mol, about 210,000 g/mol, about 220,000 g/mol, about 230,000 g/mol, about 240,000 g/mol, about 250,000 g/mol, or any range or value thereinbetween.

In some embodiments, the one or more thermoplastic polymers may have a weight average molecular weight of between about 10,000 g/mol and about 250,000 g/mol, between about 10,000 g/mol and about 240,000 g/mol, between about 10,000 g/mol and about 230,000 g/mol, between about 10,000 g/mol and about 220,000 g/mol, between about 10,000 g/mol and about 210,000 g/mol, between about 10,000 g/mol and about 200,000 g/mol, between about 10,000 g/mol and about 190,000 g/mol, between about 10,000 g/mol and about 180,000 g/mol, between about 10,000 g/mol and about 170,000 g/mol, between about 10,000 g/mol and about 160,000 g/mol, between about 10,000 g/mol and about 150,000 g/mol, between about 10,000 g/mol and about 140,000 g/mol, between about 10,000 g/mol and about 130,000 g/mol, between about 10,000 g/mol and about 120,000 g/mol, between about 10,000 g/mol and about 110,000 g/mol, between about 10,000 g/mol and about 100,000 g/mol, between about 10,000 g/mol and about 90,000 g/mol, between about 10,000 g/mol and about 80,000 g/mol, between about 10,000 g/mol and about 70,000 g/mol, between about 10,000 g/mol and about 60,000 g/mol, between about 10,000 g/mol and about 50,000 g/mol, between about 10,000 g/mol and about 40,000 g/mol, between about 10,000 g/mol and about 30,000 g/mol, between about 10,000 g/mol and about 20,000 g/mol, or any range or value therein.

In some embodiments, the one or more thermoplastic polymers may have a weight average molecular weight of between about 10,000 g/mol and about 250,000 g/mol, between about 20,000 g/mol and about 250,000 g/mol, between about 30,000 g/mol and about 250,000 g/mol, between about 40,000 g/mol and about 250,000 g/mol, between about 50,000 g/mol and about 250,000 g/mol, between about 60,000 g/mol and about 250,000 g/mol, between about 70,000 g/mol and about 250,000 g/mol, between about 80,000 g/mol and about 250,000 g/mol, between about 90,000 g/mol and about 250,000 g/mol, between about 100,000 g/mol and about 250,000 g/mol, between about 110,000 g/mol and about 250,000 g/mol, between about 120,000 g/mol and about 250,000 g/mol, between about 130,000 g/mol and about 250,000 g/mol, between about 140,000 g/mol and about 250,000 g/mol, between about 150,000 g/mol and about 250,000 g/mol, between about 160,000 g/mol and about 250,000 g/mol, between about 170,000 g/mol and about 250,000 g/mol, between about 180,000 g/mol and about 250,000 g/mol, between about 190,000 g/mol and about 250,000 g/mol, between about 200,000 g/mol and about 250,000 g/mol, between about 210,000 g/mol and about 250,000 g/mol, between about 220,000 g/mol and about 250,000 g/mol, between about 230,000 g/mol and about 250,000 g/mol, between about 240,000 g/mol and about 250,000 g/mol, or any range or value therein.

In some embodiments, the one or more thermoplastic polymers may have a weight average molecular weight between about 10,000 g/mol and about 250,000 g/mol, between about 20,000 g/mol and about 225,000 g/mol, between about 30,000 g/mol and about 200,000 g/mol, between about 40,000 g/mol and about 180,000 g/mol, between about 50,000 g/mol and about 160,000 g/mol, between about 60,000 g/mol and about 150,000 g/mol, between about 70,000 g/mol and about 140,000 g/mol, between about 80,000 g/mol and about 130,000 g/mol, between about 90,000 g/mol and about 120,000 g/mol, or between about 100,000 g/mol and about 110,000 g/mol, or any range or value therein.

k-Value

The one or more thermoplastic polymers may have any suitable k-value. For instance, in some embodiments, the k-value may be at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, or at least about 100, or any range or value thereinbetween.

In some embodiments, the k-value may be no greater than about 100, no greater than about 95, no greater than about 90, no greater than about 85, no greater than about 80, no greater than about 75, no greater than about 70, no greater than about 65, no greater than about 60, no greater than about 55, no greater than about 50, no greater than about 45, no greater than about 40, no greater than about 35, no greater than about 30, no greater than about 25, no greater than about 20, no greater than about 15, or no greater than about 10, or any range or value thereinbetween.

In some embodiments, the k-value may be about 10, about 15, about 20, about 25, about 30, about 35, about 40, about 45, about 50, about 55, about 60, about 65, about 70, about 75, about 80, about 85, about 90, about 95, or about 100, or any range or value thereinbetween.

In some embodiments, the k-value may be between about 10 and about 100, between about 20 and about 100, between about 30 and about 100, between about 40 and about 100, between about 50 and about 100, between about 60 and about 100, between about 70 and about 100, or between about 80 and about 100, or any range or value therein. In some embodiments, the k-value may be between about 10 and about 100, between about 10 and about 90, between about 10 and about 80, between about 10 and about 70, between about 10 and about 60, between about 10 and about 50, between about 10 and about 40, or between about 10 and about 30, or any range or value therein. In some embodiments, the k-value may be between about 10 and about 100, between about 20 and about 90, between about 30 and about 80, between about 40 and about 70, or between about 50 and about 60, between about 20 and about 30, between about 30 and about 40, between about 60 and about 70, between about 70 and about 80, between about 80 and about 90, or any range or value therein.

Particle Size

The one or more thermoplastic polymers may be in powder or granular form at the time of formulation and have any suitable particle size, which may be a result of the polymerization method by which the one or more thermoplastic polymers are produced (e.g., suspension polymerization and/or emulsion polymerization). In some embodiments, the particle size may be no greater than about 250 µm, no greater than about 240 µm, no greater than about 230 µm, no greater than about 220 µm, no greater than about 210 µm, no greater than about 200 µm, no greater than about 190 µm, no greater than about 180 µm, no greater than about 170 µm, no greater than about 160 µm, no greater than about 150 µm, no greater than about 140 µm, no greater than about 130 µm, no greater than about 120 µm, no greater than about 110 µm, no greater than about 100 µm, no greater than about 90 µm, no greater than about 80 µm, no greater than about 70 µm, no greater than about 60 µm, no greater than about 50 µm, no greater than about 40 µm, no greater than about 30 µm, no greater than about 20 µm, no greater than about 10 µm, no greater than about 9 µm, no greater than about 8 µm, no greater than about 7 µm, no greater than about 6 µm, no greater than about 5 µm, no greater than about 4 µm, no greater than about 3 µm, no greater than about 2 µm, no greater than about 1 µm, no greater than about 0.9 µm, no greater than about 0.8 µm, no greater than about 0.7 µm, no greater than about 0.6 µm, no greater than about 0.5 µm, no greater than about 0.4 µm, no greater than about 0.3 µm, no greater than about 0.2 µm, no greater than about 0.1 µm, or any range or value thereinbetween.

In some embodiments, the one or more thermoplastic polymers may have a particle size of no less than about 0.1 µm, no less than about 0.2 µm, no less than about 0.3 µm, no less than about 0.4 µm, no less than about 0.5 µm, no less than about 0.6 µm, no less than about 0.7 µm, no less than about 0.8 µm, no less than about 0.9 µm, no less than about 1 µm, no less than about 2 µm, no less than about 3 µm, no less than about 4 µm, no less than about 5 µm, no less than about 6 µm, no less than about 7 µm, no less than about 8 µm, no less than about 9 µm, no less than about 10 µm, no less than about 20 µm, no less than about 30 µm, no less than about 40 µm, no less than about 50 µm, no less than about 60 µm, no less than about 70 µm, no less than about 80 µm, no less than about 90 µm, no less than about 100 µm, no less than about 110 µm, no less than about 120 µm, no less than about 130 µm, no less than about 140 µm, no less than about 150 µm, no less than about 160 µm, no less than about 170 µm, no less than about 180 µm, no less than about 190 µm, no less than about 200 µm, no less than about 210 µm, no less than about 220 µm, no less than about 230 µm, no less than about 240 µm, no less than about 250 µm, or any range or value thereinbetween.

In some embodiments, the one or more thermoplastic polymers may have a particle size of about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 3 µm, about 4 µm, about 5 µm, about 6 µm, about 7 µm, about 8 µm, about 9 µm, about 10 µm, about 20 µm, about 30 µm, about 40 µm, about 50 µm, about 60 µm, about 70 µm, about 80 µm, about 90 µm, about 100 µm, about 110 µm, about 120 µm, about 130 µm, about 140 µm, about 150 µm, about 160 µm, about 170 µm, about 180 µm, about 190 µm, about 200 µm, about 210 µm, about 220 µm, about 230 µm, about 240 µm, about 250 µm, or any range or value thereinbetween.

In some embodiments, the one or more thermoplastic polymers may have a particle size of between about 0.1 µm and about 250 µm, between about 0.2 µm and about 250 µm, between about 0.3 µm and about 250 µm, between about 0.4 µm and about 250 µm, between about 0.5 µm and about 250 µm, between about 1 µm and about 250 µm, between about 2 µm and about 250 µm, between about 3 µm and about 250 µm, between about 4 µm and about 250 µm, between about 5 µm and about 250 µm, between about 6 µm and about 250 µm, between about 7 µm and about 250 µm, between about 8 µm and about 250 µm, between about 9 µm and about 250 µm, between about 10 µm and about 250 µm, between about 20 µm and about 250 µm, between about 30 µm and about 250 µm, between about 40 µm and about 250 µm, between about 50 µm and about 250 µm, between about 60 µm and about 250 µm, between about 70 µm and about 250 µm, between about 80 µm and about 250 µm, between about 90 µm and about 250 µm, between about 100 µm and about 250 µm, between about 110 µm and about 250 µm, between about 120 µm and about 250 µm, between about 130 µm and about 250 µm, between about 140 µm and about 250 µm, between about 150 µm and about 250 µm, between about 160 µm and about 250 µm, between about 170 µm and about 250 µm, between about 180 µm and about 250 µm, between about 190 µm and about 250 µm, between about 200 µm and about 250 µm, or any range or value therein.

In some embodiments, the one or more thermoplastic polymers may have a particle size of between about 0.1 µm and about 250 µm, between about 0.1 µm and about 200 µm, between about 0.1 µm and about 190 µm, between about 0.1 µm and about 180 µm, between about 0.1 µm and about 170 µm, between about 0.1 µm and about 160 µm, between about 0.1 µm and about 150 µm, between about 0.1 µm and about 140 µm, between about 0.1 µm and about 130 µm, between about 0.1 µm and about 120 µm, between about 0.1 µm and about 110 µm, between about 0.1 µm and about 100 µm, between about 0.1 µm and about 90 µm, between about 0.1 µm and about 80 µm, between about 0.1 µm and about 70 µm, between about 0.1 µm and about 60 µm, between about 0.1 µm and about 50 µm, between about 0.1 µm and about 40 µm, between about 0.1 µm and about 30 µm, between about 0.1 µm and about 20 µm, between about 0.1 µm and about 10 µm, between about 0.1 µm and about 9 µm, between about 0.1 µm and about 8 µm, between about 0.1 µm and about 7 µm, between about 0.1 µm and about 6 µm, between about 0.1 µm and about 5 µm, between about 0.1 µm and about 4 µm, between about 0.1 µm and about 3 µm, between about 0.1 µm and about 2 µm, between about 0.1 µm and about 1 µm, between about 0.1 µm and about 0.9 µm, between about 0.1 µm and about 0.8 µm, between about 0.1 µm and about 0.7 µm, between about 0.1 µm and about 0.6 µm, between about 0.1 µm and about 0.5 µm, or any range or value therein.

Formulations

The one or more thermoplastic polymers may be formulated along with any suitable ingredient to improve particular characteristics of the resulting resin (e.g., thermal stability, viscosity, etc.). For instance, non-limiting examples of such ingredients include stabilizers (e.g., primary stabilizers or co-stabilizers), lubricants (e.g., internal lubricants or external lubricants), impact modifiers (e.g., MBS, PMMA, or "core-shell impact modifiers," which are multilayer impact modifiers that have an outer shell compatible with the host polymer and a polymeric core designed to absorb impact energy, etc.), viscosity modifiers, process aids (e.g. high-molecular-weight or low-molecular-weight process aids), flame retardants, smoke suppressants, additives (e.g., dyes or "special effects" additives), scavengers (e.g. free radicals or acidic chemistries), and blend polymers.

Stabilizers and Co-Stabilizers

The polymer matrix may be formulated with primary stabilizers. In some embodiments, the primary stabilizers may comprise a metal center and a reactive group. Metals may comprise, for example, lead, barium, cadmium, calcium, zinc, di-alkyl tin, mono-alkyl tin, or combinations thereof. The reactive group(s) may comprise, for example, sulfates, carbonates, phenates (alkyl phenol sulfides), carboxylates, and mercaptides, or combinations thereof. In some embodiments, the primary stabilizers may comprise blends of lead salts (e.g., dibasic lead carbonate, dibasic lead stearate, etc.); metal soaps (e.g., calcium, magnesium, zinc, barium, tin, lead, and cadmium soaps and mixtures thereof, including, but not limited to, barium-cadmium-zinc stearate, n-octyl tin mercaptide, dibutyl tin maleate, etc., and combinations thereof); organic compounds (e.g., barbituric acid, thiobarbituric acid, crotonyl thiobarbituric acid, cinnamol thiobarbituric acid, 1,2-propane diol, etc., and combinations thereof). In some embodiments, the primary stabilizers may comprise organic stabilizers of dibutyl tin maleate, methyl tin, barium-cadmium stearate, uracil, eugenol, or combinations thereof. These stabilizers function via reaction with allylic chlorine atoms which act to inhibit zipper degradation of the polymer chain and preventing dehydrochlorination. Secondary co-stabilizers function as "scavengers" of the hydrogen chlorine/chlorine radical generated by dehydrochlorination. By way of non-limiting example, the secondary co-stabilizers may comprise calcium aluminum hydroxyl carbonate and/or hydrotalcite.

In some embodiments, the one or more stabilizers and/or co-stabilizers may be present, individually or in total, at a concentration (relative to the thermoplastic polymer resin) of 0 phr to about 5.0 phr, about 0.5 phr to about 4.5 phr, about 1.0 phr to about 4.0 phr, about 1.5 phr to about 3.5 phr, about 2.0 phr to about 3.0 phr, or any range or value therein. In some embodiments, the stabilizers and/or co-stabilizers may be present, individually or in total, at a concentration (relative to the thermoplastic polymer resin) of about 0.1 phr to about 5.0 phr, about 0.5 phr to about 5.0 phr, about 1.0 phr to about 5.0 phr, about 1.5 phr to about 5.0 phr, about 2.0 phr to about 5.0 phr, about 2.5 phr to about 5.0 phr, or about 3.0 phr to about 5.0 phr, or any range or value therein. In some embodiments, the stabilizers and/or co-stabilizers may be present, individually or in total, at a concentration (relative to the thermoplastic polymer resin) of about 0.1 phr to about 5.0 phr, about 0.1 phr to about 4.5 phr, about 0.1 phr to about 4.0 phr, about 0.1 phr to about 3.5 phr, about 0.1 phr to about 3.0 phr, about 0.1 phr to about 2.5 phr, about 0.1 phr to about 2.0 phr, about 0.1 phr to about 1.5 phr, about 0.1 phr to about 1.0 phr, about 0.1 phr to about 0.5 phr, or any range or value therein.

In some embodiments, the one or more stabilizers and/or co-stabilizers may be present, individually or in total, at a concentration (relative to the thermoplastic polymer resin) of at least about 0.1 phr, at least about 0.2 phr, at least about 0.3 phr, at least about 0.4 phr, at least about 0.5 phr, at least about 1.0 phr, at least about 1.5 phr, at least about 2.0 phr, at least about 2.5 phr, at least about 3.0 phr, at least about 3.5 phr, at least about 4.0 phr, at least about 4.5 phr, at least about 5.0 phr, or any range or value thereinbetween. In some embodiments, the one or more stabilizers and/or co-stabilizers may be present, individually or in total, at a concentration (relative to the thermoplastic polymer resin) of no greater than about 5.0 phr, no greater than about 4.5 phr, no greater than about 4.0 phr, no greater than about 3.5 phr, no greater than about 3.0 phr, no greater than about 2.5 phr, no greater than about 2.0 phr, no greater than about 1.5 phr, no greater than about 1.0 phr, no greater than about 0.5 phr, or any range or value therein between. In some embodiments, the one or more stabilizers and/or co-stabilizers may be present, individually or in total, at a concentration (relative to the thermoplastic polymer resin) of about 0.1 phr, about 0.2 phr, about 0.3 phr, about 0.4 phr, about 0.5 phr, about 0.6 phr, about 0.7 phr, about 0.8 phr, about 0.9 phr, about 1.0 phr, about 1.5 phr, about 2.0 phr, about 2.5 phr, about 3.0 phr, about 3.5 phr, about 4.0 phr, about 4.5 phr, about 5.0 phr, or any range or value thereinbetween.

Lubricants

In some embodiments, the polymer matrix formulations may comprise one or more lubricants or blends of lubricants including, but not limited to, the following: solid fatty esters (e.g., glyceryl monostearates, hydrogenated castor oil, glycerol esters of saturated fatty acids, fatty alcohol phthalate, fatty acid ester wax, fatty acid complex ester, fatty acid calcium soap); liquid fatty esters including but not limited to glycerol mono dioleate of partial ester of unsaturated fatty acids, fatty acid esters; solid hydrocarbons (e.g., synthetic paraffin wax, paraffin wax, polyethylene wax, and/or combinations thereof); solid fatty acids, alcohols, and amides (e.g., mixtures of fatty acids, mixtures of hydroxy fatty acids, mixtures of fatty alcohols, amide waxes including N,N'-ethylene distearamide, and/or combinations thereof); and metal soaps (e.g., calcium stearate, zinc stearate, and combinations thereof); ethylene vinyl acetates; and acrylics.

In some embodiments, lubricants may be present, individually or in total, at a concentration (relative to the concentration of thermoplastic resin) of 0 phr to about 4.0 phr, about 0.01 phr to about 4.0 phr, about 0.05 phr to about 4.0 phr, about 0.1 phr to about 4.0 phr, about 0.5 phr to about 4.0 phr, about 1.0 phr to about 4.0 phr, about 1.5 phr to about 4.0 phr, about 2.0 phr to about 4.0 phr, about 2.5 phr to about 4.0 phr, or any range or value therein. In some embodiments, lubricants may be present, individually or in total, at a concentration (relative to the concentration of thermoplastic resin) of about 0.01 phr to about 4.0 phr, about 0.01 phr to about 3.5 phr, about 0.01 phr to about 3.0 phr, about 0.01 phr to about 2.5 phr, about 0.01 phr to about 2.0 phr, about 0.01 phr to about 1.5 phr, about 0.01 phr to about 1.0 phr, about 0.01 phr to about 0.5 phr, about 0.01 phr to about 0.1 phr, about 0.01 phr to about 0.05 phr, or any range or value therein.

In some embodiments, lubricants may be present, individually or in total, at a concentration (relative to the concentration of thermoplastic resin) of at least about 0.01 phr, at least about 0.05 phr, at least about 0.1 phr, at least about 0.5 phr, at least about 1.0 phr, at least about 1.5 phr, at least about 2.0 phr, at least about 2.5 phr, at least about 3.0 phr, at least about 3.5 phr, at least about 4.0 phr, or any range or value thereinbetween. In some embodiments, lubricants may be present, individually or in total, at a concentration (relative to the concentration of thermoplastic resin) of no greater than about 4.0 phr, no greater than about 3.5 phr, no greater than about 3.0 phr, no greater than about 2.5 phr, no greater than about 2.0 phr, no greater than about 1.5 phr, no greater than about 1.0 phr, no greater than about 0.5 phr, no greater than about 0.1 phr, no greater than about 0.05 phr, no greater than about 0.01 phr, or any range or value thereinbetween. In some embodiments, lubricants may be present, individually or in total, at a concentration (relative to the concentration of thermoplastic resin) of about 0.01 phr, about 0.05 phr, about 0.1 phr, about 0.5 phr, about 1.0 phr, about 1.5 phr, about 2.0 phr, about 2.5 phr, about 3.0 phr, about 3.5 phr, about 4.0 phr, or any range or value thereinbetween.

Impact Modifiers

In some embodiments, the polymer matrix formulations may comprise impact modifiers or blends of impact modifiers, including acrylics, methyl methacrylate butadiene styrene (MBS), chlorinated polyethylene acrylic copolymer, chlorinated polyethylene, ethylene vinyl acetate copolymers, ethylene acrylate copolymers, anhydride grafted ethylene copolymers, methyl methacrylate, butyl acrylates, butyl acrylate grafted ethylene, and combinations thereof. Core shell modifiers are also impact modifiers comprising a multilayer structure comprising any combination of impact modifier chemistries listed above.

In some embodiments, one or more impact modifiers may be present, individually or in total, at a concentration (relative to the thermoplastic polymer resin) of about 0.01 phr to about 30 phr, about 0.01 phr to about 25 phr, about 0.01 phr to about 20 phr, about 0.01 phr to about 15 phr, about 0.01 phr to about 10 phr, about 0.01 phr to about 5 phr, about 0.01 phr to about 1 phr, about 0.01 phr to about 0.5 phr, about 0.01 phr to about 0.1 phr, about 0.01 phr to about 0.05 phr, or any range or value therein. In some embodiments, one or more impact modifiers may be present, individually or in total, at a concentration (relative to the thermoplastic polymer resin) of about 0.01 phr to about 30 phr, about 0.05 phr to about 30 phr, about 0.1 phr to about 30 phr, about 0.5 phr to about 30 phr, about 1.0 phr to about 30 phr, about 5.0 phr to about 30 phr, about 10 phr to about 30 phr, about 15 phr to about 30 phr, about 20 phr to about 30 phr, about 25 phr to about 30 phr, or any range or value therein. In some embodiments, one or more impact modifiers may be present, individually or in total, at a concentration (relative to the thermoplastic polymer resin) of about 0.01 phr to about 30 phr, about 0.05 phr to about 25 phr, about 0.1 phr to about 20 phr, about 0.5 phr to about 15 phr, about 1.0 phr to about 10 phr, or any range or value therein.

In some embodiments, one or more impact modifiers may be present, individually or in total, at a concentration (relative to the thermoplastic polymer resin) of at least about 0.01 phr, at least about 0.05 phr, at least about 0.1 phr, at least about 0.5 phr, at least about 1.0 phr, at least about 5.0 phr, at least about 10 phr, at least about 15 phr, at least about 20 phr, at least about 25 phr, at least about 30 phr, or any range or value thereinbetween. In some embodiments, one or more impact modifiers may be present, individually or in total, at a concentration (relative to the thermoplastic polymer resin) of no greater than about 30 phr, no greater than about 25 phr, no greater than about 20 phr, no greater than about 15 phr, no greater than about 10 phr, no greater than about 5.0 phr, no greater than about 1.0 phr, no greater than about 0.5 phr, no greater than about 0.1 phr, no greater than about 0.05 phr, no greater than about 0.01 phr, or any range or value thereinbetween. In some embodiments, one or more impact modifiers may be present, individually or in total, at a concentration (relative to the thermoplastic polymer resin) of about 0.01 phr, about 0.05 phr, about 0.1 phr, about 0.5 phr, about 1.0 phr, about 5.0 phr, about 10 phr, about 11 phr, about 12 phr, about 13 phr, about 14 phr, about 15 phr, about 16 phr, about 17 phr, about 18 phr, about 19 phr, about 20 phr, about 25 phr, or about 30 phr, or any range or value thereinbetween.

Process Aids

In some embodiments, the polymer matrix formulations may comprise process aids, including but not limited to acrylate-based polymers, methyl methacrylate, styrene acrylonitrile, methyl methacrylate styrene acrylonitrile, acrylic styrene acrylonitrile, or combinations thereof.

In some embodiments, one or more process aids may be present, individually or in total, at a concentration (relative to the thermoplastic polymer resin) of about 0.01 phr to about 15 phr, about 0.01 phr to about 10 phr, about 0.01 phr to about 5.0 phr, about 0.01 phr to about 1.0 phr, about 0.01 phr to about 0.5 phr, about 0.01 phr to about 0.1 phr, about 0.01 phr to about 0.05 phr, or any range or value therein. In some embodiments, one or more process aids may be present, individually or in total, at a concentration (relative to the thermoplastic polymer resin) of about 0.01 phr to about 15 phr, about 0.05 phr to about 15 phr, about 0.1 phr to about 15 phr, about 0.5 phr to about 15 phr, about 1.0 phr to about 15 phr, about 5.0 phr to about 15 phr, about 10 phr to about 15 phr, or any range or value therein. In some embodiments, one or more process aids may be present, individually or in total, at a concentration (relative to the thermoplastic polymer resin) of about 0.01 phr to about 15 phr, about 0.05 phr to about 10 phr, about 0.1 phr to about 5 phr, about 0.5 phr to about 1.0 phr, or any range or value therein.

In some embodiments, one or more process aids may be present, individually or in total, at a concentration (relative to the thermoplastic polymer resin) of at least about 0.01 phr, at least about 0.05 phr, at least about 0.1 phr, at least about 0.5 phr, at least about 1.0 phr, at least about 5.0 phr, at least about 10 phr, at least about 15 phr, or any range or value therein between. In some embodiments, one or more process aids may be present, individually or in total, at a concentration (relative to the thermoplastic polymer resin) of no greater than about 15 phr, no greater than about 10 phr, no greater than about 5.0 phr, no greater than about 1.0 phr, no greater than about 0.5 phr, no greater than about 0.1 phr, no greater than about 0.05 phr, no greater than about 0.01 phr, or any range or value thereinbetween. In some embodiments, one or more process aids may be present, individually or in total, at a concentration (relative to the thermoplastic polymer resin) of about 0.01 phr, about 0.05 phr, about 0.1 phr, about 0.5 phr, about 1.0 phr, about 1.5 phr, about 2.0 phr, about 2.2 phr, about 2.4 phr, about 2.6 phr, about 2.8 phr, about 3.0 phr, about 3.2 phr, about 3.4 phr, about 3.6 phr, about 3.8 phr, about 4.0 phr, about 4.2 phr, about 4.4 phr, about 4.6 phr, about 4.8 phr, about 5.0 phr, about 10 phr, about 15 phr, or any range or value thereinbetween.

Flame Retardants and Smoke Suppressants

In some embodiments, the polymer matrix formulations may comprise flame retardants and/or smoke suppressants. By way of non-limiting example, the flame retardants and/or smoke suppressants may comprise: halogenated materials (e.g., polyvinyl chloride (PVC), chlorinated polyvinyl chloride (CPVC), chlorinated polyethylene (CPE), polytetrafluoroethylene ("PTFE"), polyvinyl fluoride (PVF), polyvinylidene fluoride (PVDF), or combinations or blends thereof); or inorganic materials (e.g., aluminum trihydrate, magnesium hydroxide, calcium hydroxide, antimony trioxide, aluminum oxides or hydroxides, metal phosphonates, zinc borates, zinc hydroxystannate, expandable graphite, huntite, hydromagnesite, boehmite, molybdenum-based minerals, talc, zinc oxide, calcium carbonate, nano silicates and combinations thereof).

In some embodiments, one or more flame retardants and/or smoke suppressants may be present, individually or in total, at a concentration (relative to the thermoplastic polymer resin) of about 0.01 phr to about 50 phr, about 0.01 phr to about 45 phr, about 0.01 phr to about 40 phr, about 0.01 phr to about 35 phr, about 0.01 phr to about 30 phr, about 0.01 phr to about 25 phr, about 0.01 phr to about 20 phr, about 0.01 phr to about 15 phr, about 0.01 phr to about 10 phr, about 0.01 phr to about 5.0 phr, about 0.01 phr to about 1.0 phr, about 0.01 phr to about 0.5 phr, about 0.01 phr to about 0.1 phr, about 0.01 phr to about 0.05 phr, or any range or value therein. In some embodiments, one or more flame retardants and/or smoke suppressants may be present, individually or in total, at a concentration (relative to the thermoplastic polymer resin) of about 0.01 phr to about 50 phr, about 0.05 phr to about 50 phr, about 0.1 phr to about 50 phr, about 0.5 phr to about 50 phr, about 1.0 phr to about 50 phr, about 5.0 phr to about 50 phr, about 10 phr to about 50 phr, about 15 phr to about 50 phr, about 20 phr to about 50 phr, about 25 phr to about 50 phr, about 30 phr to about 50 phr, about 35 phr to about 50 phr, about 40 phr to about 50 phr, about 45 phr to about 50 phr, or any range or value therein. In some embodiments, one or more flame retardants and/or smoke suppressants may be present, individually or in total, at a concentration (relative to the thermoplastic polymer resin) of about 0.01 phr to about 50 phr, about 0.05 phr to about 45 phr, about 0.1 phr to about 40 phr, about 0.5 phr to about 35 phr, about 1.0 phr to about 30 phr, about 5.0 phr to about 25 phr, about 10 phr to about 20 phr, or any range or value therein.

In some embodiments, one or more flame retardants and/or smoke suppressants may be present, individually or in total, at a concentration (relative to the thermoplastic polymer resin) of at least about 0.01 phr, at least about 0.05 phr, at least about 0.1 phr, at least about 0.5 phr, at least about 1.0 phr, at least about 5.0 phr, at least about 10 phr, at least about 15 phr, at least about 20 phr, at least about 25 phr, at least about 30 phr, at least about 35 phr, at least about 40 phr, at least about 45 phr, at least about 50 phr, or any range or value thereinbetween. In some embodiments, one or more flame retardants and/or smoke suppressants may be present, individually or in total, at a concentration (relative to the thermoplastic polymer resin) of no greater than 50 phr, no greater than 45 phr, no greater than 40 phr, no greater than 35 phr, no greater than 30 phr, no greater than 25 phr, no greater than 20 phr, no greater than 15 phr, no greater than 10 phr, no greater than 5.0 phr, no greater than 1.0 phr, no greater than 0.5 phr, no greater than 0.1 phr, no greater than 0.05 phr, no greater than 0.01 phr, or any range or value thereinbetween. In some embodiments, one or more flame retardants and/or smoke suppressants may be present, individually or in total, at a concentration (relative to the thermoplastic polymer resin) of about 0.01 phr, about 0.05 phr, about 0.1 phr, about 0.5 phr, about 1.0 phr, about 5.0 phr, about 10 phr, about 11 phr, about 12 phr, about 13 phr, about 14 phr, about 15 phr, about 16 phr, about 17 phr, about 18 phr, about 19 phr, about 20 phr, about 25 phr, about 30 phr, about 35 phr, about 40 phr, about 45 phr, about 50 phr, or any range or value thereinbetween.

Scavengers

In some embodiments, the polymer matrix formulations may comprise one or more secondary co-stabilizers ("Scavengers") functioning as scavengers of hydrogen-chlorine/chlorine radical generated upon decomposition of chlorinated polymers. In some embodiments the one or more secondary co-stabilizers may comprise, for example, calcium aluminum hydroxyl carbonate, hydrotalcite, calcium zinc, zinc oxide, calcium oxide, and combinations thereof.

In some embodiments, the one or more scavengers may be present, individually or in total, at a concentration (relative to the concentration of thermoplastic resin) of 0 phr to about 4.0 phr, about 0.01 phr to about 4.0 phr, about 0.05 phr to about 4.0 phr, about 0.1 phr to about 4.0 phr, about 0.5 phr to about 4.0 phr, about 1.0 phr to about 4.0 phr, about 1.5 phr to about 4.0 phr, about 2.0 phr to about 4.0 phr, about 2.5 phr to about 4.0 phr, about 3.0 phr to about 4.0 phr, about 3.5 phr to about 4.0 phr, or any range or value therein. In some embodiments, the one or more scavengers may be present, individually or in total, at a concentration (relative to the concentration of thermoplastic resin) of about 0.01 phr to about 4.0 phr, about 0.01 phr to about 3.5 phr, about 0.01 phr to about 3.0 phr, about 0.01 phr to about 2.5 phr, about 0.01 phr to about 2.0 phr, about 0.01 phr to about 1.5 phr, about 0.01 phr to about 1.0 phr, about 0.01 phr to about 0.5 phr, about 0.01 phr to about 0.1 phr, about 0.01 phr to about 0.05 phr, or any range or value therein.

In some embodiments, the one or more scavengers may be present, individually or in total, at a concentration (relative to the concentration of thermoplastic resin) of at least about 0.01 phr, at least about 0.05 phr, at least about 0.1 phr, at least about 0.5 phr, at least about 1.0 phr, at least about 1.5 phr, at least about 2.0 phr, at least about 2.5 phr, at least about 3.0 phr, at least about 3.5 phr, at least about 4.0 phr, or any range or value thereinbetween. In some embodiments, the one or more scavengers may be present, individually or in total, at a concentration (relative to the concentration of thermoplastic resin) of no greater than about 4.0 phr, no greater than about 3.5 phr, no greater than about 3.0 phr, no greater than about 2.5 phr, no greater than about 2.0 phr, no greater than about 1.5 phr, no greater than about 1.0 phr, no greater than about 0.5 phr, no greater than about 0.1 phr, no greater than about 0.05 phr, no greater than about 0.01 phr, or any range or value thereinbetween. In some embodiments, the one or more scavengers may be present, individually or in total, at a concentration (relative to the concentration of thermoplastic resin) of about 0.01 phr, about 0.05 phr, about 0.1 phr, about 0.5 phr, about 1.0 phr, about 1.5 phr, about 2.0 phr, about 2.5 phr, about 3.0 phr, about 3.5 phr, about 4.0 phr, or any range or value thereinbetween.

Viscosity and Thermal Stability

Parallel Plate Viscosity

In some embodiments, the polymer matrix formulations may have a viscosity that renders them suitable for impregnating fibers (e.g., to produce continuous fiber-reinforced thermoplastic materials). In some embodiments, the viscosity of the polymer matrix formulations may be determined by parallel plate complex viscosity measurements. (See, e.g., ASTM D4440-15, *Standard Test Method for Plastics: Dynamic Mechanical Properties Melt Rheology*, ASTM INT'L, West Conshohocken, PA (2015); ISO 6721-10:2015, *Plastics—Determination of Dynamic Mechanical Properties Part* 10: *Complex Shear Viscosity Using a Parallel-Plate Oscillatory Rheometer*, INT'L ORG. FOR STANDARDIZATION, Geneva (2016).)

In some embodiments, the polymer matrix formulation may have a complex viscosity, at 100 rad/s angular frequency at about 200° C., of at least about 200 Pa·s, at least about 220 Pa·s, at least about 240 Pa·s, at least about 250 Pa·s, at least about 260 Pa·s, at least about 280 Pa·s, at least about 300 Pa·s, at least about 320 Pa·s, at least about 340 Pa·s, at least about 350 Pa·s, at least about 360 Pa·s, at least about 380 Pa·s, at least about 400 Pa·s, at least about 420 Pa·s, at least about 440 Pa·s, at least about 450 Pa·s, at least about 460 Pa·s, at least about 480 Pa·s, at least about 500 Pa·s, at least about 520 Pa·s, at least about 540 Pa·s, at least about 550 Pa·s, at least about 560 Pa·s, at least about 580 Pa·s, at least about 600 Pa·s, at least about 620 Pa·s, at least about 640 Pa·s, at least about 650 Pa·s, at least about 660 Pa·s, at least about 680 Pa·s, at least about 700 Pa·s, at least about 720 Pa·s, at least about 740 Pa·s, at least about 750 Pa·s, at least about 760 Pa·s, at least about 780 Pa·s, at least about 800 Pa·s, at least about 820 Pa·s, at least about 840 Pa·s, at least about 850 Pa·s, at least about 860 Pa·s, at least about 880 Pa·s, at least about 900 Pa·s, or any range or value thereinbetween.

In some embodiments, the polymer matrix formulation may have a complex viscosity, at 100 rad/s angular frequency at about 200° C., of no greater than about 950 Pa·s, no greater than about 940 Pa·s, no greater than about 920 Pa·s, no greater than about 900 Pa·s, no greater than about 880 Pa·s, no greater than about 860 Pa·s, no greater than about 850 Pa·s, no greater than about 840 Pa·s, no greater than about 820 Pa·s, no greater than about 800 Pa·s, no greater than about 780 Pa·s, no greater than about 760 Pa·s, no greater than about 750 Pa·s, no greater than about 740 Pa·s, no greater than about 720 Pa·s, no greater than about 700 Pa·s, no greater than about 680 Pa·s, no greater than about 660 Pa·s, no greater than about 650 Pa·s, no greater than about 640 Pa·s, no greater than about 620 Pa·s, no greater than about 600 Pa·s, no greater than about 580 Pa·s, no greater than about 560 Pa·s, no greater than about 550 Pa·s, no greater than about 540 Pa·s, no greater than about 520 Pa·s, no greater than about 500 Pa·s, no greater than about 480 Pa·s, no greater than about 460 Pa·s, no greater than about 450 Pa·s, no greater than about 440 Pa·s, no greater than about 420 Pa·s, no greater than about 400 Pa·s, no greater than about 380 Pa·s, no greater than about 360 Pa·s, no greater than about 350 Pa·s, no greater than about 340 Pa·s, no greater than about 320 Pa·s, no greater than about 300 Pa·s, no greater than about 280 Pa·s, no greater than about 260 Pa·s, no greater than about 250 Pa·s, or any range or value thereinbetween.

In some embodiments, the polymer matrix formulation may have a complex viscosity, at 100 rad/s angular frequency at about 200° C., of about 200 Pa·s, about 220 Pa·s, about 240 Pa·s, about 250 Pa·s, about 260 Pa·s, about 280 Pa·s, about 300 Pa·s, about 320 Pa·s, about 340 Pa·s, about 350 Pa·s, about 360 Pa·s, about 380 Pa·s, about 400 Pa·s, about 420 Pa·s, about 440 Pa·s, about 450 Pa·s, about 460 Pa·s, about 480 Pa·s, about 500 Pa·s, about 520 Pa·s, about 540 Pa·s, about 550 Pa·s, about 560 Pa·s, about 580 Pa·s, about 600 Pa·s, about 620 Pa·s, about 640 Pa·s, about 650 Pa·s, about 660 Pa·s, about 680 Pa·s, about 700 Pa·s, about 720 Pa·s, about 740 Pa·s, about 750 Pa·s, about 760 Pa·s, about 780 Pa·s, about 800 Pa·s, about 820 Pa·s, about 840 Pa·s, about 850 Pa·s, about 860 Pa·s, about 880 Pa·s, about 900 Pa·s, about 920 Pa·s, about 940 Pa·s, about 950 Pa·s, or any range or value thereinbetween.

In some embodiments, the polymer matrix formulation may have a complex viscosity, at 100 rad/s angular frequency at about 200° C., of between about 200 Pa·s and about 950 Pa·s, between about 200 Pa·s and about 900 Pa·s, between about 200 Pa·s and about 850 Pa·s, between about 200 Pa·s and about 800 Pa·s, between about 200 Pa·s and about 750 Pa·s, between about 200 Pa·s and about 700 Pa·s, between about 200 Pa·s and about 650 Pa·s, between about 200 Pa·s and about 600 Pa·s, between about 200 Pa·s and about 550 Pa·s, between about 200 Pa·s and about 500 Pa·s, between about 200 Pa·s and about 450 Pa·s, between about 200 Pa·s and about 400 Pa·s, between about 200 Pa·s and about 350 Pa·s, between about 200 Pa·s and about 300 Pa·s, between about 200 Pa·s and about 250 Pa·s, or any range or value therein.

In some embodiments, the polymer matrix formulation may have a complex viscosity, at 100 rad/s angular frequency at about 200° C., of between about 200 Pa·s and about 950 Pa·s, between about 220 Pa·s and about 950 Pa·s, between about 240 Pa·s and about 950 Pa·s, between about 250 Pa·s and about 950 Pa·s, between about 300 Pa·s and about 950 Pa·s, between about 350 Pa·s and about 950 Pa·s, between about 400 Pa·s and about 950 Pa·s, between about 450 Pa·s and about 950 Pa·s, between about 500 Pa·s and about 950 Pa·s, between about 550 Pa·s and about 950 Pa·s, between about 600 Pa·s and about 950 Pa·s, between about 650 Pa·s and about 950 Pa·s, between about 700 Pa·s and about 950 Pa·s, between about 750 Pa·s and about 950 Pa·s, between about 800 Pa·s and about 950 Pa·s, between about 850 Pa·s and about 950 Pa·s, between about 900 Pa·s and about 950 Pa·s, or any range or value therein.

Capillary Rheology

In some embodiments, the polymer matrix formulations may have a viscosity that renders them suitable for impregnating fibers (e.g., to produce continuous fiber-reinforced thermoplastic composite materials). In some embodiments, the viscosity of the polymer matrix formulations may be determined by capillary rheology. In some embodiments, capillary rheometry is carried out according to ASTM Reference D3835 (e.g., using an Instron Ceast SR20 rheometer). (See, e.g., ASTM D3835-02, *Standard Test Method for Determination of Properties of Polymeric Materials by Means of a Capillary Rheometer*, ASTM INT'L, West Conshohocken, PA (2002).)

In some embodiments, the polymer matrix formulation may have a viscosity, at a shear rate of 94.25 $s^{-1}$ at 390° F., of at least about 800 Pa·s, at least about 850 Pa·s, at least about 900 Pa·s, at least about 950 Pa·s, at least about 1000 Pa·s, at least about 1050 Pa·s, at least about 1100 Pa·s, at least about 1150 Pa·s, at least about 1200 Pa·s, at least about 1250 Pa·s, at least about 1300 Pa·s, at least about 1350 Pa·s, at least about 1400 Pa·s, at least about 1450 Pa·s, at least about 1500 Pa·s, at least about 1550 Pa·s, at least about 1600 Pa·s, at least about 1650 Pa·s, at least about 1700 Pa·s, at least about 1750 Pa·s, at least about 1800 Pa·s, or any range or value thereinbetween.

In some embodiments, the polymer matrix formulation may have a viscosity, at a shear rate of 94.25 $s^{-1}$ at 390° F., of no greater than about 1800 Pa·s, no greater than about 1750 Pa·s, no greater than about 1700 Pa·s, no greater than about 1650 Pa·s, no greater than about 1600 Pa·s, no greater than about 1550 Pa·s, no greater than about 1500 Pa·s, no greater than about 1450 Pa·s, no greater than about 1400 Pa·s, no greater than about 1350 Pa·s, no greater than about 1300 Pa·s, no greater than about 1250 Pa·s, no greater than about 1200 Pa·s, no greater than about 1150 Pa·s, no greater than about 1100 Pa·s, no greater than about 1050 Pa·s, no greater than about 1000 Pa·s, no greater than about 950 Pa·s, no greater than about 900 Pa·s, no greater than about 850 Pa·s, no greater than about 800 Pa·s, or any range or value thereinbetween.

In some embodiments, the polymer matrix formulation may have a viscosity, at a shear rate of 94.25 $s^{-1}$ at 390° F., of about 800 Pa·s, about 820 Pa·s, about 840 Pa·s, about 850 Pa·s, about 860 Pa·s, about 880 Pa·s, about 900 Pa·s, about 920 Pa·s, about 940 Pa·s, about 950 Pa·s, about 960 Pa·s, about 980 Pa·s, about 1000 Pa·s, about 1020 Pa·s, about 1040 Pa·s, about 1050 Pa·s, about 1060 Pa·s, about 1080 Pa·s, about 1100 Pa·s, about 1120 Pa·s, about 1140 Pa·s, about 1150 Pa·s, about 1160 Pa·s, about 1180 Pa·s, about 1200 Pa·s, about 1220 Pa·s, about 1240 Pa·s, about 1250 Pa·s, about 1260 Pa·s, about 1280 Pa·s, about 1300 Pa·s, about 1320 Pa·s, about 1340 Pa·s, about 1350 Pa·s, about 1360 Pa·s, about 1380 Pa·s, about 1400 Pa·s, about 1420 Pa·s, about 1440 Pa·s, about 1450 Pa·s, about 1460 Pa·s, about 1480 Pa·s, about 1500 Pa·s, about 1520 Pa·s, about 1540 Pa·s, about 1550 Pa·s, about 1560 Pa·s, about 1580 Pa·s, about 1600 Pa·s, about 1620 Pa·s, about 1640 Pa·s, about 1650 Pa·s, about 1660 Pa·s, about 1680 Pa·s, about 1700 Pa·s, about 1720 Pa·s, about 1740 Pa·s, about 1750 Pa·s, about 1760 Pa·s, about 1780 Pa·s, about 1800 Pa·s, or any range or value thereinbetween.

In some embodiments, the polymer matrix formulation may have a viscosity, at a shear rate of 94.25 $s^{-1}$ at 390° F., of between about 800 Pa·s and about 1800 Pa·s, between about 850 Pa·s and about 1800 Pa·s, between about 900 Pa·s and about 1800 Pa·s, between about 950 Pa·s and about 1800 Pa·s, between about 1000 Pa·s and about 1800 Pa·s, between about 1050 Pa·s and about 1800 Pa·s, between about 1100 Pa·s and about 1800 Pa·s, between about 1150 Pa·s and about 1800 Pa·s, between about 1200 Pa·s and about 1800 Pa·s, between about 1250 Pa·s and about 1800 Pa·s, between about 1300 Pa·s and about 1800 Pa·s, between about 1350 Pa·s and about 1800 Pa·s, between about 1400 Pa·s and about 1800 Pa·s, between about 1450 Pa·s and about 1800 Pa·s, between about 1500 Pa·s and about 1800 Pa·s, between about 1550 Pa·s and about 1800 Pa·s, between about 1600 Pa·s and about 1800 Pa·s, or any range or value therein.

In some embodiments, the polymer matrix formulation may have a viscosity, at a shear rate of 94.25 $s^{-1}$ at 390° F., of between about 800 Pa·s and about 1800 Pa·s, between about 800 Pa·s and about 1750 Pa·s, between about 800 Pa·s and about 1700 Pa·s, between about 800 Pa·s and about 1650 Pa·s, between about 800 Pa·s and about 1600 Pa·s, between about 800 Pa·s and about 1550 Pa·s, between about 800 Pa·s and about 1500 Pa·s, between about 800 Pa·s and about 1450 Pa·s, between about 800 Pa·s and about 1400 Pa·s, between about 800 Pa·s and about 1350 Pa·s, between about 800 Pa·s and about 1300 Pa·s, between about 800 Pa·s and about 1250 Pa·s, between about 800 Pa·s and about 1200 Pa·s, between about 800 Pa·s and about 1150 Pa·s, between about 800 Pa·s and about 1100 Pa·s, between about 800 Pa·s and about 1050 Pa·s, between about 800 Pa·s and about 1000 Pa·s, or any range or value therein. 1831 In some embodiments, the polymer matrix formulation may have a viscosity, at a shear rate of 94.25 $s^{-1}$ at 390° F., of between about 800 Pa·s and about 1800 Pa·s, between about 850 Pa·s and about 1750

Pa·s, between about 900 Pa·s and about 1700 Pa·s, between about 950 Pa·s and about 1650 Pa·s, between about 1000 Pa·s and about 1600 Pa·s, between about 1050 Pa·s and about 1550 Pa·s, between about 1100 Pa·s and about 1500 Pa·s, between about 1150 Pa·s and about 1450 Pa·s, between about 1200 Pa·s and about 1400 Pa·s, or any range or value therein.

Dynamic Thermal Stability

In some embodiments, the polymer matrix formulation has a dynamic thermal stability sufficient to ensure the polymer matrix is mechanically and chemically stable during processing at high temperatures and/or high residence times during preparation of continuous fiber-reinforced thermoplastic materials.

In some embodiments, the formulation has a dynamic thermal stability at 185° C. (about 365° F.) of at least about 5 minutes, at least about 10 minutes, at least about 15 minutes, at least about 20 minutes, at least about 25 minutes, at least about 30 minutes, at least about 35 minutes, at least about 40 minutes, at least about 45 minutes, at least about 50 minutes, at least about 55 minutes, at least about 60 minutes, or any range or value therebetween. In some embodiments, the formulation has a dynamic thermal stability at 185° C. (about 365° F.) of no greater than about 90 minutes, no greater than about 85 minutes, no greater than about 80 minutes, no greater than about 75 minutes, no greater than about 70 minutes, no greater than about 65 minutes, no greater than about 60 minutes, no greater than about 55 minutes, no greater than about 50 minutes, no greater than about 45 minutes, no greater than about 40 minutes, or any range or value therebetween. In some embodiments, the formulation has a dynamic thermal stability at 185° C. (about 365° F.) of about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, about 75 minutes, about 80 minutes, about 85 minutes, about 90 minutes, or greater, or any range or value therebetween.

Two-Roll Mill Stability

In some embodiments, the dynamic thermal stability is measured using a two-roll mill stability test. In some embodiments, the polymer matrix formulation has a two-roll mill stability sufficient to ensure the polymer matrix is mechanically and chemically stable during processing at high temperatures and/or high residence times used during preparation of continuous fiber-reinforced thermoplastic materials. In some embodiments, the two-roll mill stability is measured using a Reliable Mill 6"×13" Research Mill at 320° F.

In some embodiments, the formulation has a two-roll mill stability of at least about 30 minutes, at least about 35 minutes, at least about 40 minutes, at least about 45 minutes, at least about 50 minutes, at least about 55 minutes, at least about 60 minutes, at least about 65 minutes, at least about 70 minutes, at least about 75 minutes, at least about 80 minutes, at least about 85 minutes, at least about 90 minutes, or any range or value therebetween. In some embodiments, the formulation has a two-roll mill stability of no greater than about 120 minutes, no greater than about 115 minutes, no greater than about 110 minutes, no greater than about 105 minutes, no greater than about 100 minutes, no greater than about 95 minutes, no greater than about 90 minutes, no greater than about 85 minutes, no greater than about 80 minutes, no greater than about 75 minutes, no greater than about 70 minutes, no greater than about 65 minutes, no greater than about 60 minutes, or any range or value therebetween. In some embodiments, the formulation has a two-roll mill stability of about 30 minutes, about 35 minutes, about 40 minutes, about 45 minutes, about 50 minutes, about 55 minutes, about 60 minutes, about 65 minutes, about 70 minutes, about 75 minutes, about 80 minutes, about 85 minutes, about 90 minutes, about 95 minutes, about 100 minutes, about 105 minutes, about 110 minutes, about 115 minutes, about 120 minutes, or greater, or any range or value therebetween.

Composite Materials

In another aspect, the present disclosure relates to composite materials or structures comprising the thermoplastic polymer matrix compositions of the present disclosure. For purposes of the present disclosure, the term "composite material" or "composite" refers to a material produced from two or more constituent materials (e.g., a matrix material and a reinforcing material). In some composite materials, a matrix material (e.g., a thermoplastic polymer matrix composition) is in contact with a reinforcing material (e.g., one or more fibers). The matrix material may impregnate the reinforcing material, e.g., such that the voids between individual reinforcing material components (e.g., individual fibers) are filled with the matrix material. The reinforcing material may be chemically bound to the matrix material, but the formation of chemical bonds is not required.

As the reinforcing material, any fiber having a melting point higher than the resin matrix may be suitable for the production of composite structures. By way of non-limiting example, the reinforcing material may comprise organic or inorganic fibers comprising carbon, glass, basalt, aramid, boron, ultrahigh molecular weight polyethylene ("UHMW PE"), high performance PP, polybenzoxazole ("PBO"), quartz, ceramic, natural fibers, and acrylic fibers. This technology is applicable to woven and non-woven fiber structures. In some embodiments, the reinforcing material comprises continuous fibers (e.g., fibers geometrically characterized as having a very high length-to-diameter ratio), which include unidirectional continuous fibers, woven cloths comprising continuous fibers, or roving continuous fibers. For purposes of this disclosure, the term "continuous fiber(s)" refers to fiber(s) having a high length-to-diameter ratio or which have a length (l) greater than the critical length ($l_c$). (See, e.g., W. D. Callister & D. G. Rethwisch, MATERIALS SCIENCE AND ENGINEERING: AN INTRODUCTION 564-606 (10th ed. 2018).)

In some embodiments, the fibers are present in one or more layers or sheets. In some embodiments, a composite material according to the present disclosure comprises only one sheet of fiber material or multiple sheets (e.g., two or more) comprising one or more fiber materials. In some embodiments having multiple sheets of fiber materials, the individual sheets of fiber materials may comprise the same fiber material, or different sheets may comprise different types of fiber materials from one another.

In some embodiments, a composite material may comprise at least about 10% by volume of the reinforcing material (relative to the total volume of reinforcing material and matrix material). In some embodiments, a composite material may comprise at least about 20%, at least about 30%, at least about 40%, at least about 50%, at least about 60%, at least about 70%, or at least about 80%, by volume, of the reinforcing material.

In some embodiments, the composite material comprises: a thermoplastic polymer matrix composition according to the present disclosure; and a reinforcing material in contact with the thermoplastic polymer matrix composition. In some embodiments, the reinforcing material comprises a continuous fiber material. In some embodiments, the reinforcing material comprises a carbon-based continuous fiber material. In some embodiments, the thermoplastic polymer matrix composition impregnates the reinforcing material.

In another aspect, the present disclosure relates to a method of making a composite material, comprising contacting a thermoplastic polymer matrix composition with a reinforcing material. In some embodiments, the contacting comprises impregnating the reinforcing material with the thermoplastic polymer matrix composition. In some embodiments, the contacting is performed at a temperature and pressure at which the viscosity of the thermoplastic polymer matrix composition is low enough to permit impregnating the reinforcing material with the thermoplastic polymer matrix composition.

Manufactured Articles

In some embodiments, the present disclosure relates to a manufactured article consisting of, consisting essentially of, or comprising a thermoplastic polymer matrix composition according to the present disclosure. In some embodiments, the present disclosure relates to a manufactured article consisting of, consisting essentially of, or comprising a composite material comprising: a thermoplastic polymer matrix composition; and a reinforcing material in contact with the thermoplastic polymer matrix composition. In some embodiments, the reinforcing material comprises a continuous fiber material. In some embodiments, the reinforcing material comprises a carbon-based continuous fiber material. In some embodiments, the thermoplastic polymer matrix composition impregnates the reinforcing material.

Such articles may include but are not limited to components used in the mass transit, automotive, aviation, marine, agriculture and heavy equipment, medical, and building materials industries. By way of non-limiting examples, such articles may include instrument panels, armrests, shrouds, motor covers, fenders, body panels, hood assemblies, tray table inlays, tray tables, seat backs, IFE bezels, privacy panels, monuments, lavatory surfaces, high touch areas of an aircraft cabin, bus interior, train car interior, heavy equipment interior, or automobile interior, countertops, bulkheads, doors, fire doors, hospital furniture (e.g., hospital beds), kiosks, medical devices, medical carts, monitors, monitor shrouds, instrument housings (e.g., MRI housing), radomes, wall coverings, window masks/shrouds, point-of-sale displays, antenna covers, and other similar articles.

Recyclability

Since PVC is a thermoplastic, it is fully recyclable but requires sufficient thermal stability for multiple heat cycles. Therefore, unused portions of composite using the mentioned methods of formulating would be suitable for reprocessing. For example, trimmed portions or flawed parts could be divided (e.g., chopped) and re-used in compression molding or injection molding processes.

The following examples are given for the purpose of illustrating various embodiments of the disclosure and are not meant to limit the present disclosure in any fashion. One skilled in the art will appreciate readily that the present disclosure is well adapted to carry out the objects and obtain the ends and advantages mentioned, as well as those objects, ends and advantages inherent herein. The present examples, along with the methods described herein are presently representative of embodiments and are exemplary and are not intended as limitations on the scope of the disclosure. Changes therein and other uses which are encompassed within the spirit of the disclosure as defined by the scope of the claims will occur to those skilled in the art. It is to be understood that this present technology is not limited to particular methods, reagents, compounds compositions or polymer systems, which can, of course, vary. The terminology used in the description herein is for the purpose of describing particular embodiments only and is not intended to be limiting.

EXAMPLES

Resin Formulations

Thermoplastic polymer matrices (resins) were formulated according to the following procedure. Raw PVC resin was added to a high intensity mixer. The PVC was mixed and heated from the shear of the blades to a temperature of approximately 85° F., and stabilizer was added to the PVC. After the temperature reached 160° F., the process aids, impact modifiers, flame and smoke suppressants, and lubricants were added. After mixing, the formulation was discharged and cooled. Exemplary formulations prepared by the above-discussed method are detailed in Tables 1 and 2 below.

TABLE 1

Formulation for Example 5
Example 5

| Ingredient | Type | phr |
|---|---|---|
| PVC Resin | K-Value 50 IV .51 | 100 |
| Stabilizers | Tin-based | 2.00 |
| Modifiers | Styrene-based | 11.00 |
| Process Aids | Acrylic-based | 3.80 |
| Lubricants | Polyolefin, polyester-based | 1.90 |

TABLE 2

Formulation for Example 12
Example 12

| Ingredient | Type | phr |
|---|---|---|
| PVC Resin | K-Value 47.1 | 100 |
| Stabilizers | Tin-based | 2.20 |
| Modifiers | Acrylic-based | 16.00 |
| Process Aids | Acrylic-based | 2.80 |
| Lubricants | Polyolefin, polyester-based | 1.70 |
| FR Package | Fillers/Minerals | 10.00 |

The following additional Examples were used throughout the development of Example 5: Example 3 is the initial, existing low molecular weight PVC formulation with standard additives that was used as the starting point for the development of Example 5. Example 4 is the same as Example 3, but with a higher efficiency modifier and process aid to improve dynamic thermal stability and rheology. Example 6 is the same as Example 5 but replaces the Styrene-based modifier with an Acrylic-based modifier to reduce complex viscosity.

The following additional Examples were used throughout the development of Example 12: Example 7 is the initial, existing low molecular weight PVC formulation with FR additives that was used as a starting point for the development of Example 12.

The following additional Examples were used as reference samples throughout the development of Example 5 and Example 12: Example 14 is a reference sample representing a reduced dynamic thermal stability and higher molecular weight PVC formulation. Example 17 is a reference sample representing a standard PVC formulation used for extruded PVC profiles. Example 18 is a reference sample representing a standard PVC formulation without stabilizers, process aids or lubricants. Example 19 is a reference sample representing a standard PVC formulation without process aids or lubricants but containing a minimal amount of tin-based stabilizers.

Thermal Stability Characterization (Two-Roll Mill Stability)

Thermal stability of the formulated resins was determined by a two-roll mill stability test using a Reliable Mill 6"×13" Research Mill. A 500 g load of test material (powder or granular form) was loaded onto two moving rolls set at a temperature of 320° F. Once the material had banded, 1"×1" samples were removed from the center of the roll at predetermined time intervals until the material became stuck or the material had degraded (e.g., had begun to exhibit a dark coloration), denoting the mill stability time (see FIG. 1A).

The thermal stabilities of the samples were approximated by measuring B value as a function of time on the roll mill. As shown in Table 3 and FIG. 1B, the formulation of Example 5 shows much higher mill stability time, reaching its degradation time at 60 minutes. Meanwhile, the degradation time for Examples 3 and 4 exhibited mill stability times of only 40 minutes. Thus, the formulation of Example 5 evidences a much higher thermal stability and ability to withstand the calendaring process used to produce films.

TABLE 3

B Value Versus Time for PVC Resin Formulations Undergoing Two-Roll Mill Stability Test

| | B Value | | |
|---|---|---|---|
| Time (min) | Example 5 | Example 3 | Example 4 |
| 10 | 168 | 181 | 156 |
| 20 | 136 | 169 | 150 |
| 30 | 133 | 120 | 93 |
| 40 | 104 | 70 | 8 |
| 50 | 68 | | |
| 60 | 30 | | |

Dynamic Thermal Stability (DTS)

Dynamic thermal stability of the prepared PVC formulations was assessed using a button stability test. A 58 g charge of powder for each formulation was processed at 185° C. in a Brabender mixer operated at a rotor speed of 75 rpm. A sample chip was removed from the mixture at 2, 4, 6, 8, 10, 12, 15, 20, 25, 30, 40, 50, and 60 minutes after mixing started, or up to the time of the sample's decomposition, and the melt temperature and torque were recorded. Finally, a sample chip was removed from each formulation when the sample began to decompose (e.g., crosslink), as indicated by a torque rise of at least 100 meter-grams or visible darkening of the sample indicated by a shift from brown to black, or B value less than 10, at which time the test was completed.

Figure 2A:
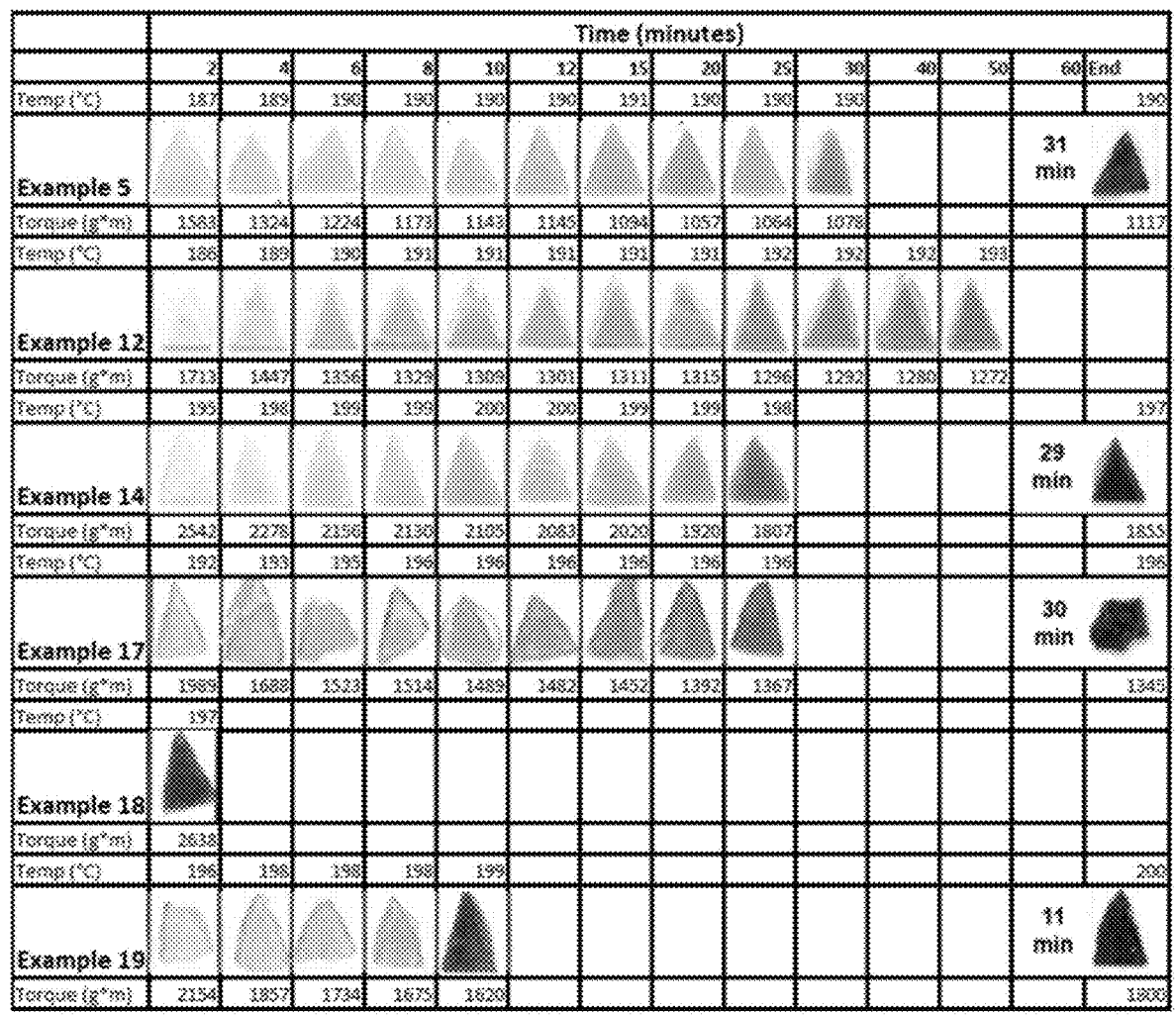
FIG. 2A shows the sample coloration as a function of mixing time for Example PVC resin formulations during dynamic thermal stability testing using a Brabender mixer.
Figure 2B:
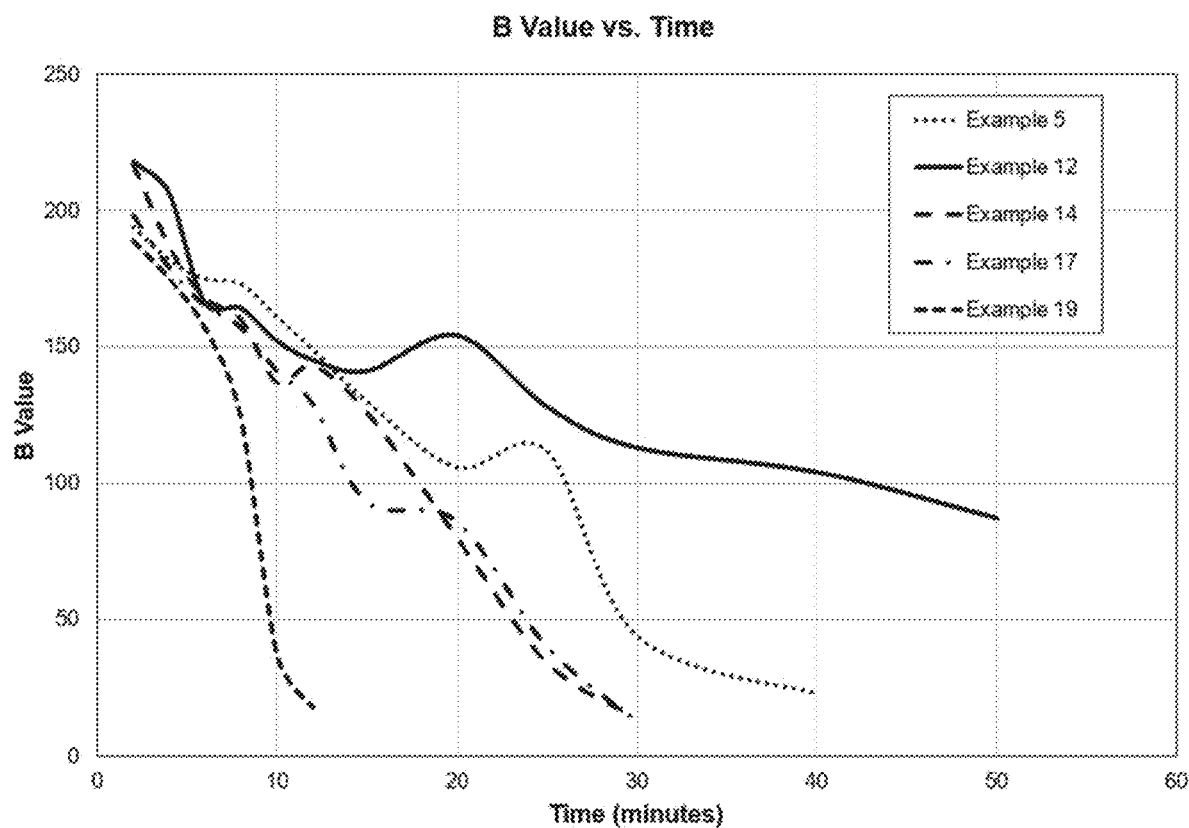
FIG. 2B shows B value versus time for the Example PVC resin formulations at during dynamic thermal stability testing using a Brabender mixer.

FIGS. 2A and 2B show the sample coloration and B value, respectively, as a function of mixing time for Examples 5, 12, 14, 17, 18, and Example 19. Example 12 exhibited the longest degradation time, without undergoing full degradation, even after 50 minutes, followed by Example 5, at 31 minutes and Example 17 at 30 minutes. Meanwhile, Examples 14, 18, and 19 showed the lowest dynamic thermal stability times, with a degradation time of only 29 minutes, 2 minutes, and 11 minutes, respectively. These results indicate that formulations of Example 5 and Example 12 possess sufficient dynamic thermal stability to withstand processing temperatures necessary for producing continuous fiber-reinforced thermoplastic composite materials.

Parallel Plate Viscosity

To determine a viscosity range that permits PVC formulations to impregnate carbon fibers, rheological characterization of Examples 3 through 7 and Example 12 was carried out using parallel plate viscosity testing. For each Example formulation, a sample of 25 mm×25 mm×1 mm was processed on a parallel plate rheometer at 200° C., a typical temperature for polymer processing. The angular frequency was controlled from 100 to 0.1 rad/s, and the complex viscosity was measured in Pa·s.

Figure 3:
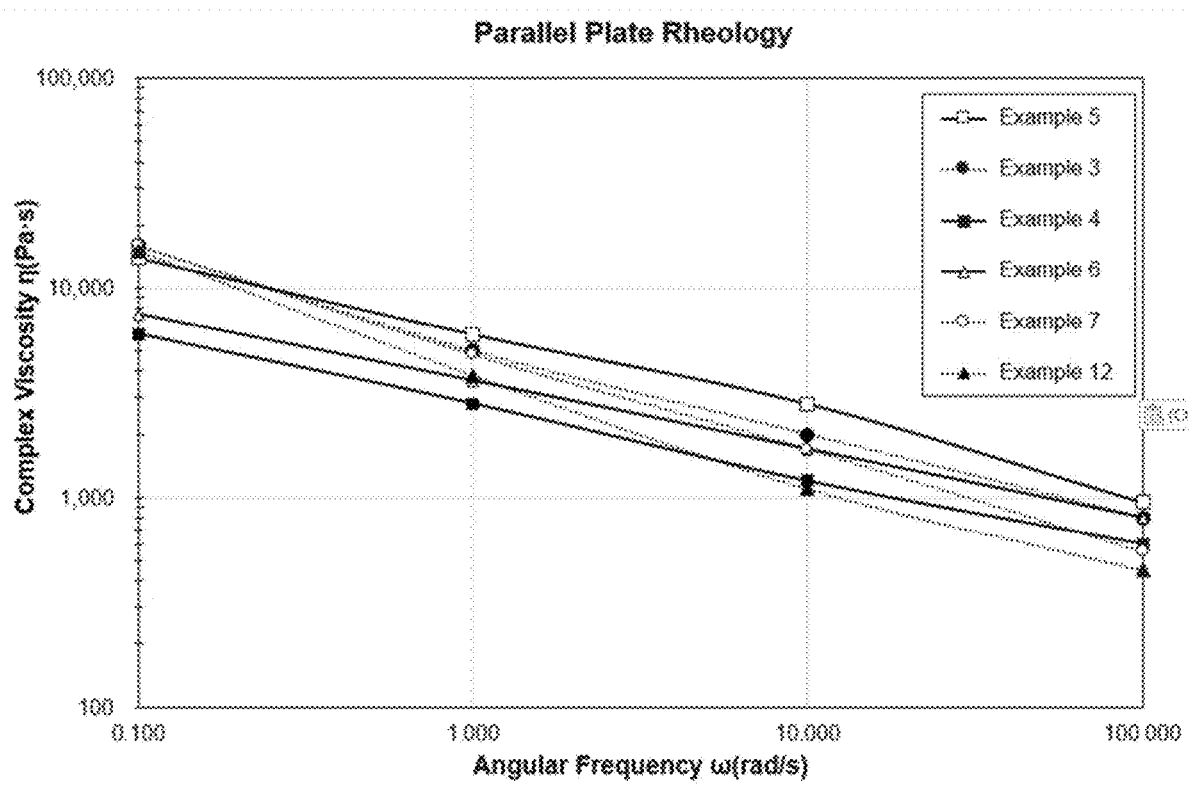
FIG. 3 is a plot of complex viscosity versus angular frequency for Example PVC resin formulations, obtained during parallel plate viscosity measurements.

The complex viscosity data is summarized below in Table 4 and shown in FIG. 3. Example 12 had a complex viscosity of 450 Pa·s at 100 rad/s angular frequency at 200° C. and was used successfully in fiber impregnation. Example 5 had a complex viscosity of 950 Pa·s at 100 rad/s angular frequency at 200° C. and also was used successfully in fiber impregnation. Example 5 showed relatively high complex viscosity across the entire angular frequency range, including the highest complex viscosity among all samples at 1, 10, and 100 rad/s. All formulations show a complex viscosity of at least 6,000 Pa·s at 0.100 rad/s and at least 450 Pa·s at 100 rad/s, indicating that these formulations possess suitable complex viscosity to successfully impregnate continuous fibers for producing continuous fiber-reinforced thermoplastic composite materials.

TABLE 4

Complex viscosity data for PVC formulations according to the present disclosure, measured at 200° C.

| Angular Frequency | Complex Viscosity $\eta$ (Pa · s) | | | |
|---|---|---|---|---|
| $\omega$ (rad/s) | 0.1 | 1 | 10 | 100 |
| Example 3 | 16,000 | 5,000 | 2,000 | 800 |
| Example 4 | 6,000 | 2,800 | 1,200 | 600 |
| Example 5 | 14,000 | 6,000 | 2,800 | 950 |
| Example 6 | 7,500 | 3,600 | 1,700 | 800 |
| Example 7 | 16,000 | 4,800 | 1,700 | 550 |
| Example 12 | 15,000 | 3,800 | 1,100 | 450 |

Viscosity—Capillary Rheometer Testing

As an additional method for identifying a viscosity range for PVC formulations that will permit impregnation of continuous fibers with PVC-based resins, viscosities were measured by capillary rheometry using an INSTRON® Ceast SR20 rheometer (according to ASTM Reference D3835. (See ASTM D3835-02, *Standard Test Method for Determination of Properties of Polymeric Materials by Means of a Capillary Rheometer*, ASTM INT'L, West Conshohocken, PA (2002).)

Figure 4A:
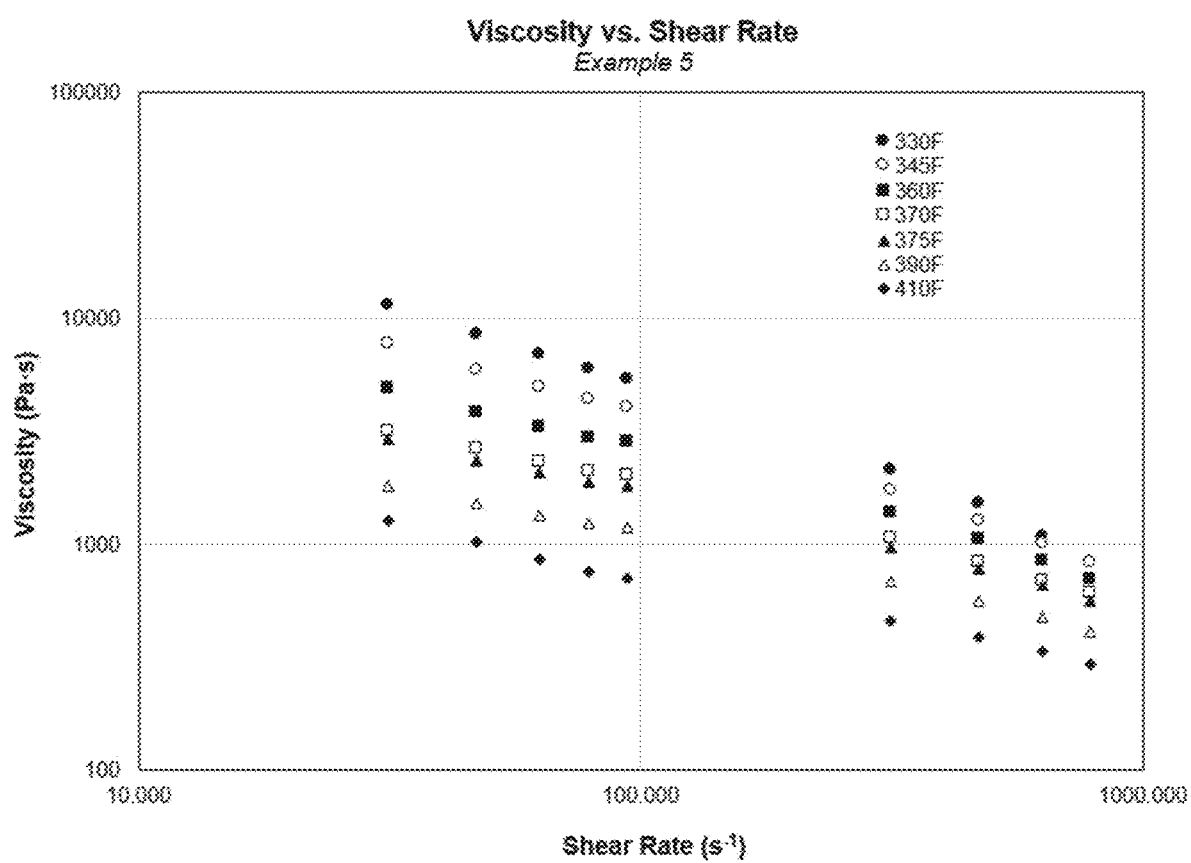
FIG. 4A is a plot of viscosity versus time for PVC resin formulation Example 5, using a capillary rheometer.
Figure 4B:
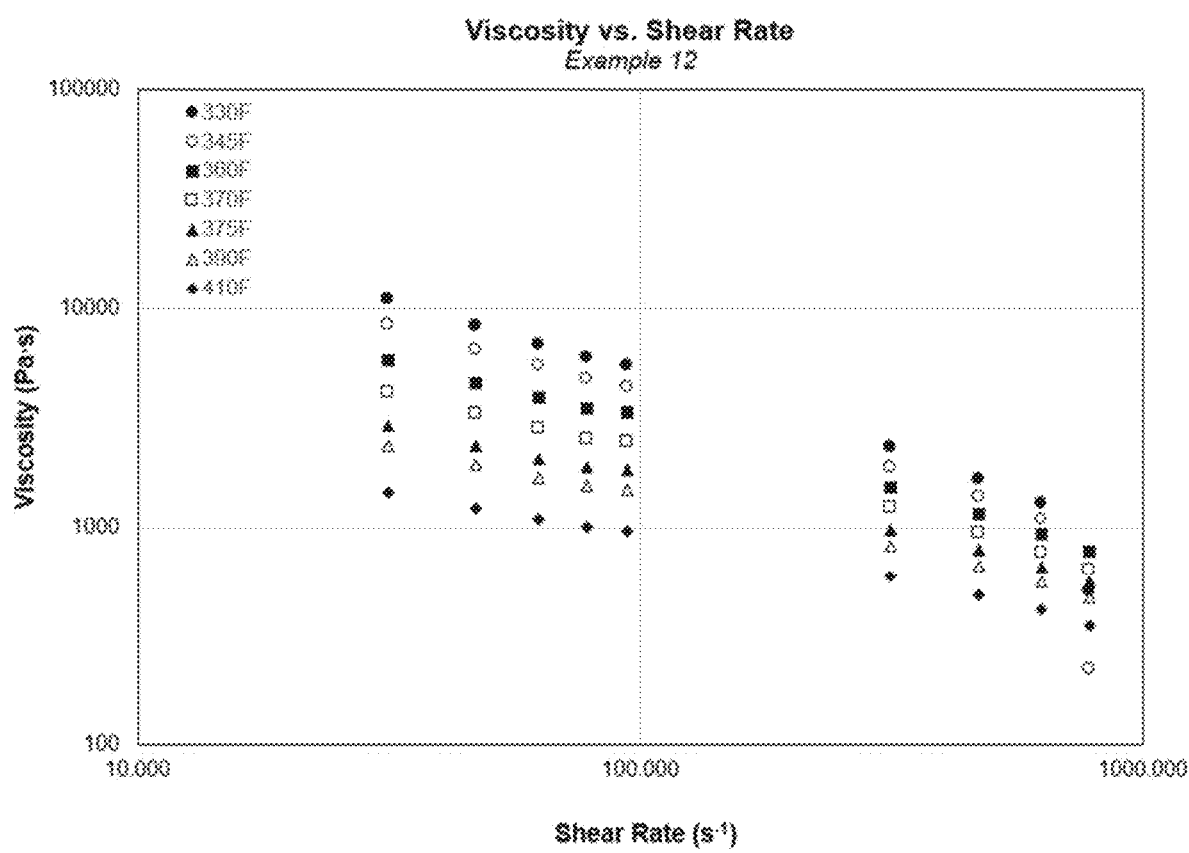
FIG. 4B is a plot of viscosity versus time for PVC resin formulation Example 12, using a capillary rheometer.

A sample of each PVC formulation in powder, granule, or pellet form was loaded into the capillary rheometer barrel. The materials were pre-heated for a set amount of time (measured in minutes) at a temperature applicable to the polymer being tested (e.g., between 330° F. and 410° F.) before applying various rates of shear (e.g., 30-900 $s^{-1}$) and measuring the resulting viscosity in Pa·s. The results are shown in FIGS. 4A and 4B (Examples 5 and 12, respectively) plotted on a scatter plot to compare different material rheological behaviors. As evidenced by the data, Example 5 showed a viscosity of 1186 Pa·s at 390° F. and a shear rate of 94.25 $s^{-1}$. Example 12 showed a viscosity of 1477 Pa·s at 390° F. and a shear rate of 94.25 $s^{-1}$.

Flammability and Smoke Properties

During development, it was discovered that the flame and smoke properties of the resulting composite (polymer with fiber reinforcement) were greatly improved over a bulk compound (solid polymer with no fiber reinforcement). Table 5 below shows the test results for the composite and bulk compounds of the formulation containing no flame retardants (Example 5) and the formulation containing flame retardants (Example 12) when tested to the stringent Federal Aviation Administration (FAA) flammability standard used for commercial transport aircraft interiors (14 CFR 25.853 (d) for heat release and smoke density). The formulation containing no flame retardants (Example 5) passes all requirements of the FAA test as a composite but not as a bulk compound, whereas the formulation containing flame retardants (Example 12) passes all requirements both as a composite and as a bulk compound. This would allow a composite impregnated with the formulation containing no flame retardants (Example 5) to be used in applications that previously would have required the use of formulations containing flame retardants (such as Example 12).

TABLE 5

Flame and Smoke Properties

| Units | OSU 2 min kW*min/m² | OSU Peak kW/m² | Smoke Density $D_s$ |
|---|---|---|---|
| Requirement | ≤65 kW*min/m² | ≤65 kW/m² | ≤200 |
| Example 5 (Bulk) | 122 | 103 | 543 |
| Example 5 (Composite) | 52 | 47 | 175 |
| Example 12 (Bulk) | 50 | 44 | 167 |
| Example 12 (Composite) | 31 | 31 | 85 |

The present disclosure is not to be limited in terms of the particular embodiments described in this application, which are intended as single illustrations of individual aspects of the disclosure. All the various embodiments of the present disclosure will not be described herein. Many modifications and variations of the disclosure can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. While not explicitly defined below, such terms should be interpreted according to their common meaning.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

It is to be understood that the present disclosure is not limited to particular uses, industries, methods, reagents, compounds, compositions, characterization methods, or biological systems, which can, of course, vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

Unless the context indicates otherwise, it is specifically intended that the various features of the invention described herein can be used in any combination. Moreover, the disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless explicitly indicated otherwise, all specified embodiments, features, and terms intend to include both the recited embodiment, feature, or term and biological equivalents thereof.

All patents, patent applications, provisional applications, and publications referred to or cited herein are incorporated by reference in their entirety, including all figures and tables, to the extent they are not inconsistent with the explicit teachings of this specification.

What is claimed is:

1. A thermoplastic polymer matrix composition for a continuous fiber reinforced thermoplastic composite article, comprising:
   100 phr of poly(vinyl chloride) having a k-value of at least about 30 and about 60 or less;
   1.5 to 4 phr of one or more tin-based stabilizers or co-stabilizers;
   10 to 30 phr of one or more styrene-based or acrylic-based core-shell modifiers;
   0.1 to 5 phr of one or more acrylic-based process aids; and
   0.5 to 5 phr of one or more polyolefin- or polyester-based lubricants.

2. The composition of claim 1, further comprising at least one of: blend polymers; oligomers; and additives.

3. The composition of claim 2, wherein the composition comprises one or more blend polymers and/or oligomers selected from acrylics, acrylic copolymers, olefins, olefin copolymers, polyamides, polyamide copolymers, acrylonitrile butadiene styrene, styrenics, and combinations or blends thereof.

4. The composition of claim 2, wherein the composition comprises one or more additives selected from scavengers, smoke suppressants, fillers, colorants, special effects additives, and combinations thereof.

5. The composition of claim 2, wherein the one or more blend polymers comprises poly(methyl methacrylate).

6. The composition of claim 1, wherein the composition has a two-roll mill stability of at least 30 minutes at 320° F.

7. The composition of claim 6, wherein the composition has a two-roll mill stability of at least 40 minutes at 320° F.

8. The composition of claim 6, wherein the composition has a two-roll mill stability of at least 50 minutes at 320° F.

9. The composition of claim 1, wherein the composition has a complex viscosity, measured as parallel plate viscosity, of at least about 450 Pas at 100 rad/s angular frequency and 200° C.

10. The composition of claim 1, wherein the composition has a viscosity, measured by capillary rheology, of at least about 1,100 Pa's at 390° F. and a shear rate of 94.25 $s^{-1}$.

11. The composition of claim 10, wherein the composition has a viscosity, measured by capillary rheology, of at least about 1,400 Pas at 390° F. and a shear rate of 94.25 $s^{-1}$.

12. The composition of claim 1, wherein the composition comprises:
   1.5 to 3.5 phr of the one or more tin-based stabilizers or co-stabilizers;
   10 to 20 phr of the one or more styrene-based or acrylic-based core-shell modifiers;
   1 to 5 phr of the one or more acrylic-based process aids; and
   1 to 5 phr of the one or more polyolefin- or polyester-based lubricants.

13. The composition of claim 12, further comprising:
   0.01 to 3 phr of one or more scavengers; and
   0.01 to 50 phr of one or more flame retardants.

14. A method of formulating a thermoplastic polymer matrix composition for a continuous fiber reinforced thermoplastic composite article,
   wherein the composition comprises:
      poly(vinyl chloride) having a k-value of at least about 30 and about 60 or less;
      1.5 to 4 phr of one or more tin-based stabilizers or co-stabilizers;
      10 to 30 phr of one or more styrene-based or acrylic-based core-shell modifiers;
      0.01 to 0.1 to 5 phr of one or more acrylic-based process aids; and
      0.5 to 5 phr of one or more polyolefin- or polyester-based lubricants, the method comprising:
   adjusting the dynamic thermal stability of the composition, measured by a two-roll mill stability test, to at least 30 minutes at 320° F., by adding one or more stabilizers, co-stabilizers, and/or lubricants to the composition; and
   adjusting the viscosity of the composition, as measured by capillary rheology at 390° F. and a shear rate of 94.25 $s^{-1}$, to at least 1,000 Pa's by adding one or more lubricants, blend polymers, and/or process aids to the composition.

15. The method of claim 14, wherein the dynamic thermal stability is at least 40 minutes at 320° F.

16. The method of claim 15, wherein the dynamic thermal stability is at least 50 minutes at 320° F.

17. The method of claim 14, wherein the viscosity is at least 1,100 Pa·s.

18. The method of claim 14, wherein the viscosity is at least 1,400 Pa·s.

19. The method of claim 14, wherein the composition comprises poly(methyl methacrylate).

20. A composite material, comprising:
   a thermoplastic polymer matrix composition comprising:
      poly(vinyl chloride) having a k-value of at least about 30 and about 60 or less;
      1.5 to 4 phr of one or more tin-based stabilizers or co-stabilizers;
      10 to 30 phr of one or more styrene-based or acrylic-based core-shell modifiers;
      0.01 to 0.1 to 5 phr of one or more acrylic-based process aids; and
      0.5 to 5 phr of one or more polyolefin- or polyester-based lubricants; and
   a reinforcing material comprising continuous fibers in contact with the thermoplastic polymer matrix composition,
   wherein the thermoplastic polymer matrix composition impregnates the reinforcing material.

* * * * *